(12) United States Patent
Sarkar et al.

(10) Patent No.: US 7,235,321 B2
(45) Date of Patent: *Jun. 26, 2007

(54) SOLID OXIDE FUEL CELL SYSTEM

(75) Inventors: Partho Sarkar, Edmonton (CA); Hongsang Rho, Edmonton (CA); Lorne Johanson, Edmonton (CA)

(73) Assignee: Alberta Research Council, Inc., Edmonton, Alberta (CA)

( * ) Notice: Subject to any disclaimer, the term of this patent is extended or adjusted under 35 U.S.C. 154(b) by 206 days.

This patent is subject to a terminal disclaimer.

(21) Appl. No.: 10/997,787

(22) Filed: Nov. 23, 2004

(65) Prior Publication Data

US 2005/0196657 A1    Sep. 8, 2005
US 2006/0127725 A9    Jun. 15, 2006

Related U.S. Application Data

(63) Continuation of application No. PCT/CA03/00761, filed on May 23, 2003, which is a continuation-in-part of application No. 10/156,755, filed on May 23, 2002, now Pat. No. 6,936,367.

(51) Int. Cl.
*H01M 8/12* (2006.01)
*H01M 8/06* (2006.01)
*H01M 8/24* (2006.01)

(52) U.S. Cl. .................. 429/31; 429/20; 429/32; 429/38; 429/44

(58) Field of Classification Search .................. 429/20, 429/31, 32, 38, 39, 44, 45
See application file for complete search history.

(56) References Cited

U.S. PATENT DOCUMENTS

| | | | |
|---|---|---|---|
| 4,454,207 A | 6/1984 | Fraioli et al. | |
| 4,567,117 A | 1/1986 | Patel et al. | |
| 4,729,931 A | 3/1988 | Grimble | |
| 4,791,035 A | 12/1988 | Reichner | |
| 5,169,730 A | 12/1992 | Reichner et al. | |
| 5,188,910 A | 2/1993 | Ishihara et al. | |
| 5,244,752 A | 9/1993 | Zymboly | |
| 5,354,626 A | 10/1994 | Kobayashi et al. | |
| 5,380,600 A | 1/1995 | Hansen et al. | |
| 5,411,767 A | 5/1995 | Soma et al. | |

(Continued)

FOREIGN PATENT DOCUMENTS

| | | |
|---|---|---|
| EP | 0 055 011 A | 6/1982 |
| EP | 0 410 796 A | 1/1991 |
| EP | 0 442 742 A | 8/1991 |
| JP | 02 192665 | 7/1990 |
| JP | 04 355059 | 12/1992 |

(Continued)

*Primary Examiner*—Stephen J. Kalafut
(74) *Attorney, Agent, or Firm*—Knobbe, Martens, Olson & Bear LLP

(57) ABSTRACT

This invention relates to a fuel cell system comprising an outer tubular solid oxide fuel cell, a solid phase porous matrix located inside the outer fuel cell and attached to its inner electrode layer, and at least one inner tubular solid oxide fuel cell embedded in the matrix. The outer fuel cell has an inner electrode layer configured to receive a first reactant fluid, an outer electrode layer configured to receive a second reactant fluid, and an electrolyte layer sandwiched between the electrode layers. The inner fuel cell has an outer electrode layer configured to receive the first reactant fluid, an inner electrode layer configured to receive the second reactant fluid, and an electrolyte layer sandwiched between the inner and outer electrode layers. The matrix has sufficient mechanical strength to support the inner fuel cell and sufficient porosity to enable the first reactant fluid to flow through the matrix to the inner and outer fuel cell respectively.

32 Claims, 24 Drawing Sheets

U.S. PATENT DOCUMENTS

| | | |
|---|---|---|
| 5,518,827 A | 5/1996 | Matsumura et al. |
| 5,733,675 A | 3/1998 | Dederer et al. |
| 5,763,114 A | 6/1998 | Khandkar et al. |
| 5,827,620 A | 10/1998 | Kendall |
| 5,932,368 A * | 8/1999 | Batawi et al. ............ 429/45 X |
| 5,976,721 A | 11/1999 | Limaye |
| 5,993,989 A | 11/1999 | Baozhen et al. |
| 6,017,646 A | 1/2000 | Prasad et al. |
| 6,423,436 B1 * | 7/2002 | George et al. ................ 429/31 |
| 6,709,782 B2 * | 3/2004 | Keegan et al. ................ 429/38 |
| 6,824,907 B2 * | 11/2004 | Sarkar et al. ................ 429/31 |
| 6,838,205 B2 * | 1/2005 | Cisar et al. ................ 429/33 X |
| 6,936,367 B2 | 8/2005 | Sarkar et al. |

FOREIGN PATENT DOCUMENTS

| | | |
|---|---|---|
| JP | 05 013090 A | 5/1993 |
| JP | 08 050914 | 2/1996 |
| JP | 2000 182645 A | 6/2000 |
| WO | WO 99/17390 | 4/1999 |
| WO | WO 02/15310 A | 2/2002 |
| WO | WO 03/069705 | 8/2003 |

* cited by examiner

Fig. 4
Fig. 3
Fig. 5
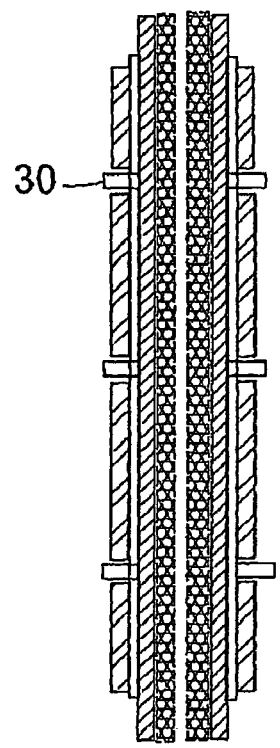
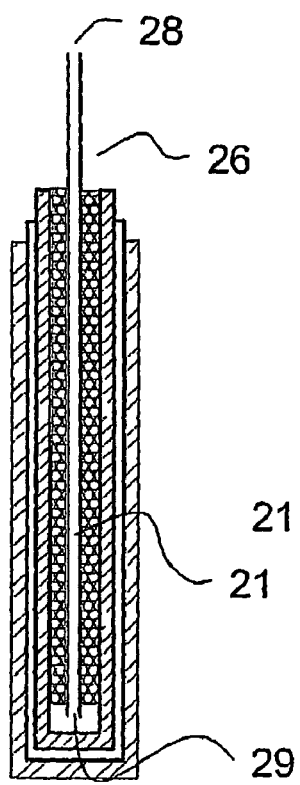
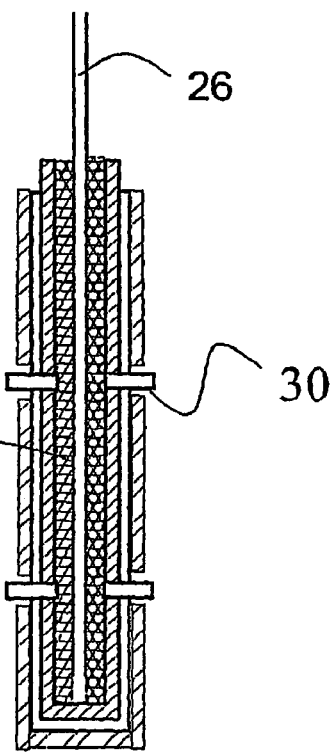

Fig. 11
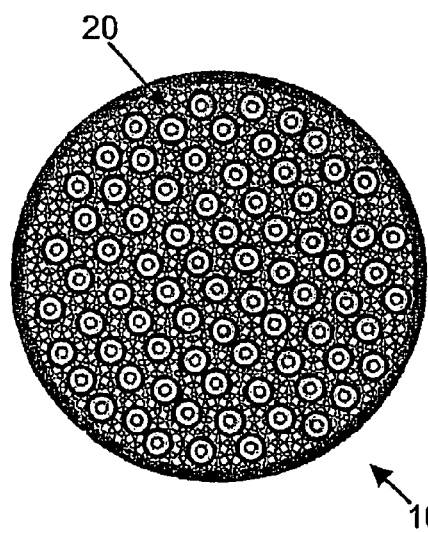
Fig. 12
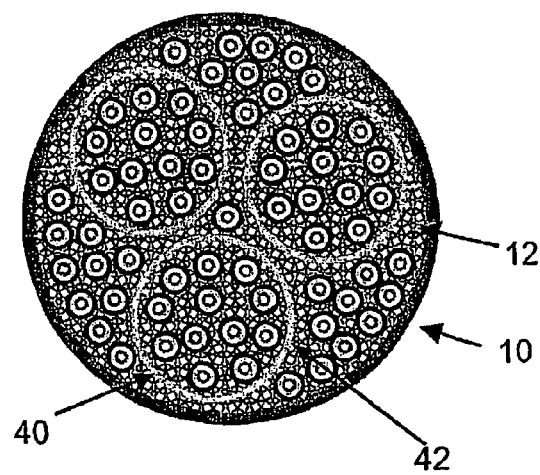
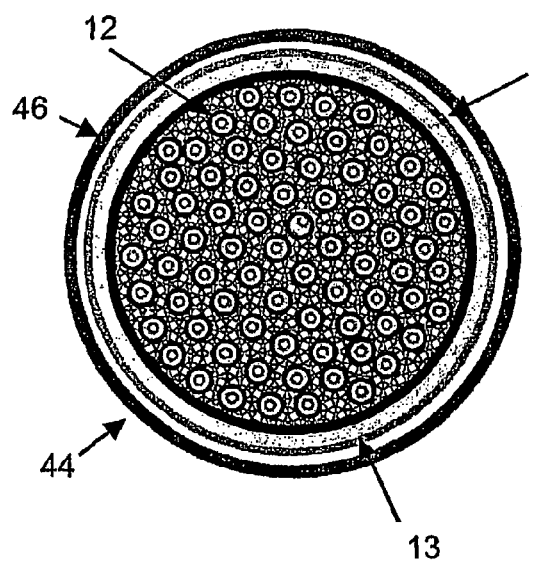
Fig. 13
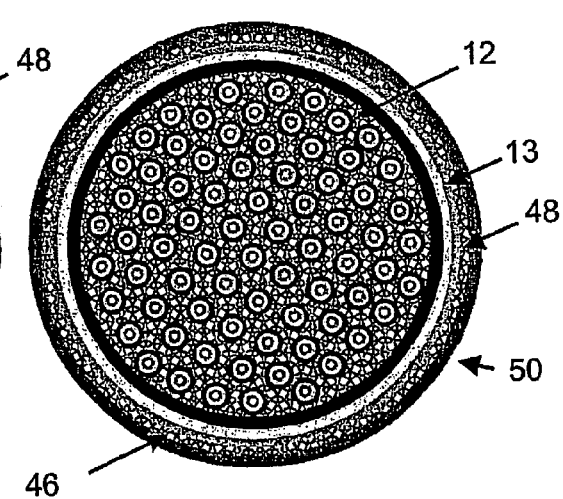
Fig. 14

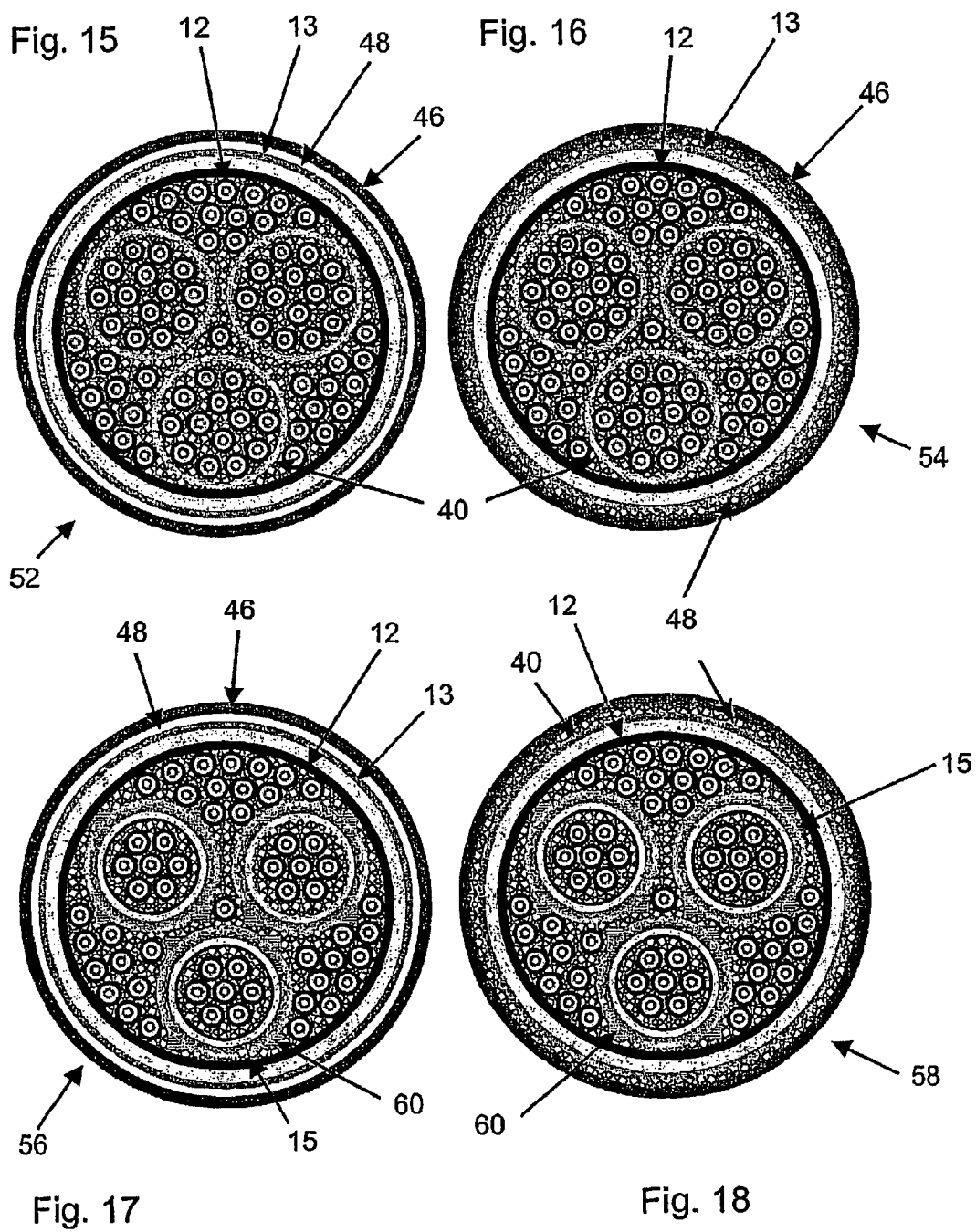

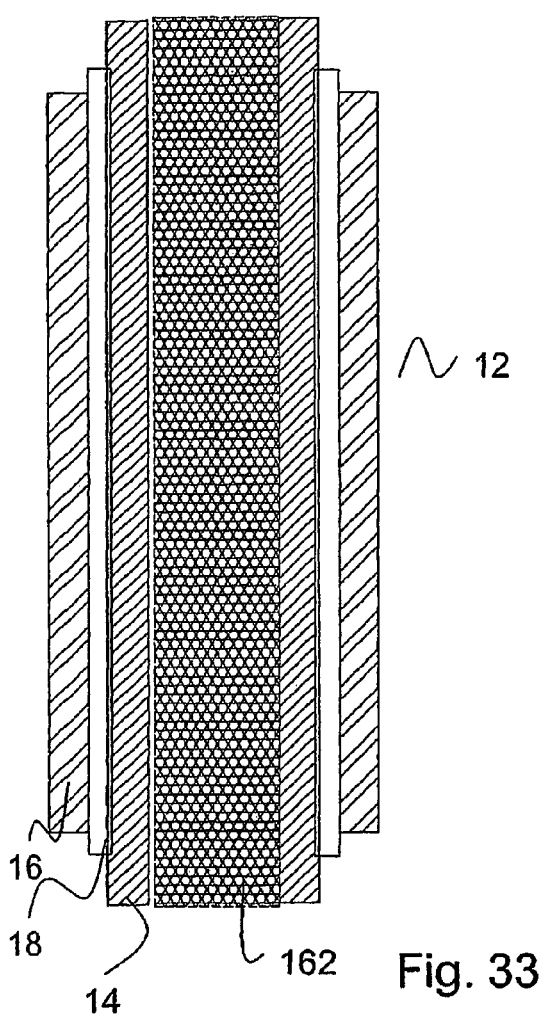
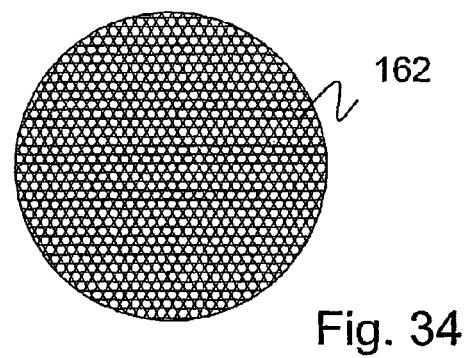
Fig. 34
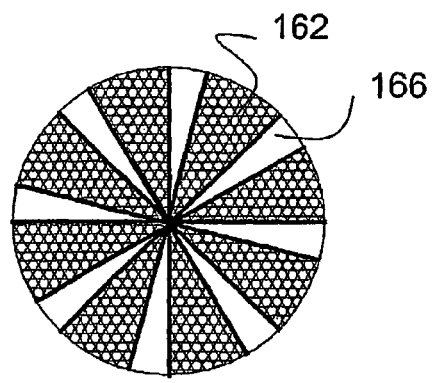
Fig. 35
Fig. 33

SOLID OXIDE FUEL CELL SYSTEM

CROSS REFERENCE TO RELATED APPLICATION

This application is a continuation of PCT application Ser. No. PCT/CA03/00761, which was filed May 23, 2003 designating the US and published in English on Dec. 4, 2003 as WO 03/100881, which is a continuation-in-part of U.S. patent application Ser. No. 10/156,755, filed May 23, 2002 now U.S. Pat. No. 6,936,367. The above PCT and US patent applications are incorporated herein by reference in their entireties and made part of the present disclosure.

FIELD OF THE INVENTION

This invention relates to a fuel cell system having a stack of tubular solid oxide fuel cells.

BACKGROUND OF THE INVENTION

In general, a solid oxide fuel cell (SOFC) comprises a pair of electrodes (anode and cathode) separated by a ceramic, solid-phase electrolyte. To achieve adequate ionic conductivity in such a ceramic electrolyte, the SOFC operates at an elevated temperature, typically in the order of about 1000° C. The material in typical SOFC electrolytes is a fully dense (i.e. non-porous) yttria-stabilized zirconia (YSZ) which is an excellent conductor of negatively charged oxygen (oxide) ions at high temperatures. Typical SOFC anodes are made from a porous nickel/zirconia cermet while typical cathodes are made from magnesium doped lanthanum manganate ($LaMnO_3$), or a strontium doped lanthanum manganate (also known as lanthanum strontium manganate (LSM)). In operation, hydrogen or carbon monoxide (CO) in a fuel stream passing over the anode reacts with oxide ions conducted through the electrolyte to produce water and/or $CO_2$ and electrons. The electrons pass from the anode to outside the fuel cell via an external circuit, through a load on the circuit, and back to the cathode where oxygen from an air stream receives the electrons and is converted into oxide ions which are injected into the electrolyte. The SOFC reactions that occur include:

Anode reaction:
$H_2+O^=\rightarrow H_2O+2e^-$
$CO+O^=\rightarrow CO_2+2e^-$
$CH_4+4O^=\rightarrow 2H_2O+CO_2+8e^-$ Cathode reaction:
$O_2+4e^-\rightarrow 2O^=$ Known SOFC designs include planar and tubular fuel cells. Applicant's own PCT application no. PCT/CA01/00634 discloses a method of producing a tubular fuel cell by electrophoretic deposition (EPD). The fuel cell comprises multiple concentric layers, namely an inner electrode layer, a middle electrolyte layer, and an outer electrode layer. The inner and outer electrodes may suitably be the anode and cathode respectively, and in such case, fuel may be supplied to the anode by passing through the tube, and air may be supplied to the cathode by passing over the outer surface of the tube.

It is also known to arrange a plurality of tubular fuel cells in an array or "stack" to increase electrical output. Designs have been proposed for stacking together relatively large-diameter (≧5 mm) thick-walled tubular fuel cells that are essentially self-supporting; for example it is known to stack large diameter tubular fuel cells having diameters in a grid-like pattern and interconnect the fuel cells with nickel felt spacers. This and other known designs for large diameter self-supporting tubular fuel cells are not particularly well suited for small diameter fuel cells (≦5 mm), especially if such small diameter fuel cells are arranged into a tightly-packed array. It is therefore desirable to provide an improved stack design that enables the close-packing of a plurality of small-diameter tubular fuel cells, and a system for such stack.

SUMMARY OF THE INVENTION

According to one aspect of the invention, there is provided a fuel cell system comprising an outer tubular solid oxide fuel cell, a solid phase porous matrix located inside the outer fuel cell and attached to its inner electrode layer, and at least one inner tubular solid oxide fuel cell embedded in the matrix substantially inside the outer fuel cell. The outer fuel cell has an inner electrode layer configured to receive a first reactant fluid, an outer electrode layer configured to receive a second reactant fluid, and an electrolyte layer sandwiched between the electrode layers. The inner fuel cell has an outer electrode layer configured to receive the first reactant fluid, an inner electrode layer configured to receive the second reactant fluid, and an electrolyte layer sandwiched between the inner and outer electrode layers. The matrix has sufficient mechanical strength to support the inner fuel cell within the outer fuel cell and sufficient porosity to enable the first reactant fluid to flow through the matrix to the inner electrode layer of the outer fuel cell and to the outer electrode layer of the inner fuel cell.

The matrix can be a solid state porous foam or a metal mesh. When the matrix is a foam, it can be an electronic or mixed (electronic and ionic) conductive material and can be electrically coupled to the cathode of the inner and outer fuel cells. The foam's composition can include one or more materials selected from the group consisting of: lanthanum strontium manganate, 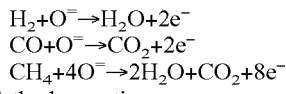, 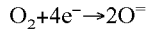$Mg_xCrO_3$, $LaCr(Mg)O_3$, $LaCa_{1-x}Cr_yO_3$, stainless steel 316 and 316L, Ni-Yittria stabilized zirconia, Ni and doped zirconia cermet, Ni doped—$CeO_2$ cermet, Cu doped-ceria cermet, silver-(Bi—Sr—Ca—Cu—O)-oxide cermet, silver-(Y—Ba—Cu—O)-oxide cermet; silver-alloy-(Bi—Sr—Ca—Cu—O)-oxide cermet; silver-alloy-(Y—Ba—Cu—O)-oxide cermet; silver and its alloys, Inconel steel and any super alloy, ferritic steel, SiC, and $MoSi_2$.

The inner fuel cell's inner electrode layer can be an anode, in which case its outer electrode layer is a cathode; correspondingly, the outer fuel cell's inner electrode layer is a cathode, and its outer electrode is an anode. With such a configuration, the first reactant is fuel, and the second reactant is oxidant.

The inner fuel cell can have a diameter between 10 μm and 10,000 μm, or more particularly, between 10 μm and 5,000 μm.

The matrix can include at least one elongate void for enhancing the delivery of oxidant to the cathode of the inner and outer fuel cells. There can also be an oxidant diffuser that has an inlet fluidly connectable to an oxidant source, and a plurality of outlets fluidly coupled to the matrix.

The fuel cell system can also include a plurality of tab openings through the outer electrode and electrolyte layers of the inner fuel cell, and a gas-impermeable, electrically conductive tab located in and sealing each opening. The tab openings are spaced along the length of the inner fuel cell. Each tab is electrically connected to the inner electrode layer of the inner fuel cell and is electrically connectable to an external circuit. Each tab can be an inert metal coating that is suitable for use under SOFC operating conditions. At least one current collector rod can be embedded in the matrix, and be electrically connected to at least one of the tabs and be electrically connectable to an external circuit. Alternatively, a current collector plate can be transversely embedded in the matrix inside the outer fuel cell. The plate is electrically insulated or isolated from the matrix by a high temperature insulating material between the plate and the matrix or by a gap between the plate and the matrix. The plate has an opening for receiving the inner fuel cell, and perforations that enable the flow through of a reactant fluid to the outer electrode layer of the inner fuel cell and the inner electrode layer of the outer fuel cell. The current collector plate in this case is electrically connected to at least one of the tabs and is electrically connectable to an external circuit.

The fuel cell system can include a fuel reformer, having a reformer chamber with a fuel inlet for fluidly coupling to an unreformed fuel source and a fuel outlet fluidly coupled to the anode of the inner and outer fuel cells. The reformer chamber is thermally coupled with at least one of the fuel cells so that the heat produced by the fuel cell reaction is used to reform unreformed fuel. The reformer chamber can be a double-walled cup and in which case the fuel cell is located inside the cavity of the cup. A catalyst-coated solid state porous matrix can be provided inside the reformer chamber. Alternatively, the reformer chamber can be a reformer tube coiled around the outer fuel cell; the fuel inlet and outlet are located at opposite ends of the tube. The reformer tube can include catalytic material dispersed along the inside of the reformer tube.

The inner fuel cell can further comprise a porous electrically conductive current collector located inside the inner fuel cell, electrically coupled to its inner electrode layer, and having sufficient porosity to enable the flow of the second reactant fluid through the current collector and to the inner fuel cell's inner electrode layer.

According to another aspect of the invention, there is provided a fuel cell system comprising at least one tubular solid oxide fuel cell, a porous electrically conductive current collector located inside the fuel cell, and a solid phase porous support matrix in which the fuel cell is embedded. The fuel cell has an outer electrode layer configured to receive a first reactant fluid, an inner electrode layer configured to receive a second reactant fluid, and an electrolyte layer sandwiched between the electrode layers. The current collector is electrically coupled to the inner electrode layer, and has sufficient porosity to enable the second reactant fluid to flow through the current collector and to the inner electrode layer. The support matrix has sufficient mechanical strength to support the fuel cell inside the system and sufficient porosity to enable the first reactant fluid to flow through the matrix and to the outer electrode layer.

The current collector can be a solid state porous matrix lining at least part of the surface of the inner electrode layer. Alternatively, the current collector can be one of the following:

a bundle of overlapping metal, ceramic or cermet fibres;

a bundle of metal, ceramic or cermet wool;

a plurality of perforated sheets attached at their edges to the surface of the inner electrode layer; or an electrically conductive rod or wire extending longitudinally through the inside of the fuel cell and a plurality of electrically conductive filaments extending generally transversely between the collector rod and the inner electrode layer.

The current collector can have a porosity of between 25 and 95%, and more particularly, between 40 and 95%, and even more particularly, about 60%.

The current collector can be coated with a catalyst material. At least one current collector rod or wire can be embedded in the current collector matrix inside the fuel cell. The rod or wire can have at least one end that is electrically connectable to an external circuit. The current collector matrix can include at least one elongate void for enhancing the flow of reactant through the matrix.

The current collector matrix can be a solid state foam; the foam can be made of one or more materials selected from the group consisting of: lanthanum strontium manganate, $La_{1-x}Sr_xCrO_3$, $La_{1-x}Ca_xCrO_3$, $La_{1-x}Mg_xCrO_3$, $LaCr(Mg) O_3$, $LaCa_{1-x}Cr_{-y}O_3$, $La_{1-x}Sr_xFeO_3$, $(La_{1-x}Sr_x)(Fe_{1-y}Co_y)O_3$, stainless steel 316 and 316L, Ni-Yittria stabilized zirconia, Ni and doped zirconia cermet, Ni doped—$CeO_2$ cermet, Cu doped-ceria cermet, silver-(Bi—Sr—Ca—Cu—O)-oxide cermet, silver-(Y—Ba—Cu—O)-oxide cermet; silver-alloy-(Bi—Sr—Ca—Cu—O)-oxide cermet; silver-alloy-(Y—Ba—Cu—O)-oxide cermet; silver and its alloys, Inconel steel and any super alloy, ferritic steel, SiC, and $MoSi_2$.

The support matrix can also be a solid-state foam. The support foam can be made of an electronic or mixed (electronic and ionic) conductive porous solid state material and be electrically coupled to the inner electrode layer of the outer fuel cell and the outer electrode layer of the inner fuel cell. The support foam can be made of the same materials as the current collector foam.

According to another aspect of the invention, there is provided a fuel cell system including:

a fuel cell stack comprising a plurality of tubular solid oxide fuel cells and a stack support structure attached to each of the fuel cells, the fuel cells each comprising an anode, a cathode, and an electrolyte sandwiched between the anode and cathode;

a fuel reformer tube and including a reformer chamber having a reformer fuel inlet fluidly couplable to a fuel source and a reformer fuel outlet fluidly coupled with the anode of at least one fuel cell;

external circuit electrical leads electrically coupled to the anode and cathode of at least one fuel cell and electrically couplable to an external electrical circuit; and a thermal enclosure assembly enclosing the stack and reformer tube and including a fuel inlet fluidly coupled to the reformer fuel inlet, a fuel outlet fluidly coupled to the anode of at least one fuel cell, and an oxidant inlet and outlet fluidly coupled to the cathode of at least one fuel cell.

According to yet another aspect of the invention, there is provided a fuel cell system that includes at least one tubular solid oxide fuel cell, an electrically conductive tab for electrically coupling to an external circuit, and a stack support structure attached to each of the fuel cells. The fuel cell includes an electrode inner layer, an electrode outer layer, an electrolyte layer sandwiched between the electrode layers, and a tab opening through the electrode outer layer and the underlying electrolyte layer. The tab includes an electrically conductive material coating the exposed portion of the inner layer.

BRIEF DESCRIPTION OF DRAWINGS

FIG. 3 is a schematic longitudinal section view of a tubular SOFC closed at one end.

FIG. 4 is a schematic longitudinal side view of a tubular SOFC open at both ends and having a plurality of electrically conductive anode tabs.

FIG. 5 is a schematic longitudinal side view of the tubular SOFC of FIG. 3 having a plurality of electrically conductive anode tabs.

FIGS. 11 and 12 are schematic end views of fuel cell stacks comprising a plurality of tubular fuel cells embedded in the matrix (FIG. 11) and a plurality of fuel cells and sub-stacks of fuel cells embedded in the matrix (FIG. 12).

FIGS. 13 and 14 are schematic end views of two fuel cell stack designs that each comprise a plurality of inner tubular fuel cells embedded in a foam-like porous matrix and located inside an outer fuel cell.

FIGS. 15 and 16 are schematic end views of two different fuel cell stack designs that each comprise a plurality of fuel cell sub-stacks and inner tubular fuel cells embedded in a foam-like porous matrix and located inside an outer tubular fuel cell.

FIGS. 17 and 18 are schematic end views of two fuel cell stack designs that each comprise a plurality of small-diameter and intermediate-diameter fuel cells embedded in a foam-like porous matrix and located inside an large-diameter outer tubular fuel cell.

FIGS. 33 is a schematic sectional longitudinal view of a fuel cell having a porous foam-like inner core.

FIG. 34 is a schematic cross-sectional view of the inner core of FIG. 33, and

FIG. 35 shows the inner core of FIG. 34 having interspersed reactant flow channels.

DETAILED DESCRIPTION

Definitions

When describing the present invention, the following terms have the following meanings, unless indicated otherwise. All terms not defined herein have their common art-recognized meanings.

The term "fibre" or "filament" refers to a single strand of fibrous material; "fibre tow" or "fibre bundle" shall refer to a multi-filament yarn or an array of fibres; and "fibre core" shall refer to a fibre, filament, fibre tow or fibre bundle. In all cases, the fibre core is electrically conductive or treated to be electrically conductive to allow its use as an electrode.

The term "ceramic" refers to inorganic non-metallic solid materials with a prevalent covalent or ionic bond including, but not limited to metallic oxides (such as oxides of aluminum, silicon, magnesium, zirconium, titanium, chromium, lanthanum, hafnium, yttrium and mixtures thereof) and nonoxide compounds including but not limited to carbides (such as of titanium tungsten, boron, silicon), silicides (such as molybdenum disicilicide), nitrides (such as of boron, aluminum, titanium, silicon) and borides (such as of tungsten, titanium, uranium) and mixtures thereof; spinels, titanates (such as barium titanate, lead titanate, lead zirconium titanates, strontium titanate, iron titanate), ceramic super conductors, zeolites, and ceramic solid ionic conductors (such as yittria stabilized zirconia, beta-alumina and cerates).

The term "cermet" refers to a composite material comprising a ceramic in combination with a metal, typically but not necessarily a sintered metal, and typically exhibiting a high resistance to temperature, corrosion, and abrasion.

The term "porous" in the context of hollow ceramic, metal, and cermet membranes and matrices means that the material contains pores (voids). Therefore, the density of the porous material is lower than that of the theoretical density of the material. The voids in the porous membranes and matrices can be connected (i.e., channel type) or disconnected (i.e. isolated). In a porous hollow membrane or matrix, the majority of the pores are connected. To be considered porous as used herein in reference to membranes, a membrane should have a density which is at most about 95% of the theoretical density of the material. The amount of porosity can be determined by measuring the bulk density of the porous body and from the theoretical density of the materials in the porous body. Pore size and its distribution in a porous body can be measured by mercury or non-mercury porosimeters, BET or microstructural image analysis as is well known in the art.

It is to be understood in this specification that directional terms such as bottom, top, upwards, downwards etc. are used only for convenient reference and are not to be construed as limitations to the assembly or use of the apparatus described herein.

Figure 1:
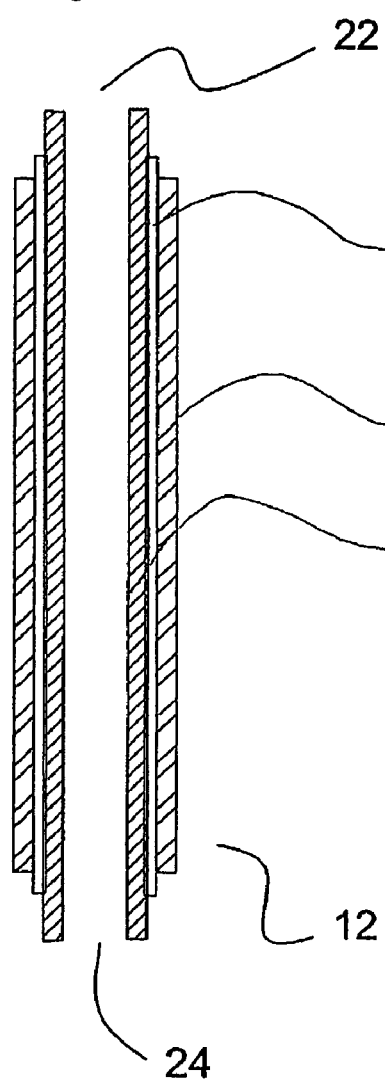
FIG. 1 is a schematic longitudinal section view of a tubular solid oxide fuel cell (SOFC).

Referring to FIG. 1, a small-diameter tubular solid oxide fuel cell 12 comprises three concentric hollow inorganic membranes (HIM) that are in continuous contact with each other to form a multi-membrane structure. The inner membrane layer is an anode 14, the outer membrane is a cathode 16, and the middle membrane is an electrolyte 18. The anode 14 or cathode 16 membranes can each be single-layered, or multiple-layered, as is known in the art. In the latter case, the multiple layers can include a functional or electrochemically active electrode sub-layer and an electrode current collector sub-layer (both not shown). The current collector sub-layer can cover the entire surface of the electrode sub-layer, or can be in the form of strips. The current collector sub-layer can made from Ni, Cu, Ag, Au or Cu—Ni-alloy, Ag—Ni alloy or any other metallic or electronic conductor.

To serve as electrodes, the inner and outer membranes 14, 16 are made of a material that is porous, catalytic, and electrically and ionically conductive. This enables the electrodes 14, 16 to collect electrical current, to allow reactant to flow to the electrolyte 18, to encourage electrochemical reactions, and to conduct ions that permeate through the electrolyte 18. In this embodiment, the anode 14 is made of a nickel and zirconia cermet. The anode 14 may optionally have a thin layer of nickel on the inner surface of the cermet layer, such that a two-layered anode structure is provided. The cathode 16 is made of LSM. The electrolyte 18 is made of a zirconia ceramic material. The anode 14 preferably has a thickness of between 1 µm to 800 µm. The cathode 16 preferably has a thickness of between 1 µm to 200 µm. The electrolyte 18 preferably has a thickness of between 0.5 µm to 25 µm. The total diameter of the fuel cell 12 is preferably between 10 µm to 3000 µm but may be as large as 10,000 µm. The fuel cell length is $\geq 50 \times$ the diameter.

To provide a tubular fuel cell 12 with these characteristics, and in particular, with the desired dimensions, the inner anode layer 14 may be formed by depositing cermet material on a combustible electrically conductive core (not shown, and commonly referred to as a "deposition electrode") by electrophoretic deposition (EPD). The electrolyte layer 18 may be formed by depositing YSZ material onto the inner electrode layer 14 by EPD. One suitable process for producing an inner electrode and electrolyte by EPD is described in Applicant's PCT application no. PCT/CA01/00634. The outer electrode layer 16 may be formed by applying a LSM layer onto the electrolyte 18 by one of dip-coating or painting as known in the art, or by EPD. One or more sintering steps are carried out to combust the conductive core.

In certain commercial applications, it is desirable to provide a fuel cell system having a relatively high power density, i.e. a fuel cell system that provides a high power-to-volume ratio. Such high power densities may be achieved by assembling the fuel cells 12 in close proximity to each other to produce a fuel cell stack 10. Also, higher power densities can be achieved by increasing the active surface area per unit volume of the system; for example, the active surface area per unit volume can be increased by decreasing the diameter of each tubular fuel cell 12, thereby increasing the number of fuel cells 12 that can be stacked in a given volume. Therefore, it is preferred to employ small-diameter tubular fuel cells 12 having a diameter between 10–10,000 µm and more preferably between 10 and 5,000 µm. Such small-diameter fuel cells 12 especially if made of ceramic or some of its composites tend to be somewhat fragile, and are relatively vulnerable to damage when assembled into a tightly packed array; that is, ceramic structures being brittle tend to fail catastrophically. Thin-walled elongate ceramic structures tend to be particularly fragile, and may fail when subjected to bending forces or vibrations that exceed the fracture stress of the ceramic. Therefore, the fuel cells 12 are embedded in a solid phase porous foam matrix 20 (shown, for example, in FIG. 6). "Matrix" as used in this specification means a solid phase material in which another material is embedded, such as the solid-phase foam used in this embodiment, or a metal mesh.

The matrix 20 is made from ceramic or another material that is able to withstand typical SOFC operating temperatures, e.g. steel or a superalloy. The matrix 20 may be made of LSM to enable it to operate at up to around 1000° C. and to serve to collect current, to ionize oxygen into oxide ions, and to conduct these ions to the electrolyte. The matrix 20 fills the spaces between the fuel cells 12 and contacts the outer surface of each fuel cell 12, i.e. the cathode layer 16 of each fuel cell 12. Because the matrix 20 is of the same material as the cathode layer 16 and provides a continuous conductive pathway between the fuel cells 12, the matrix 20 serves to increase the effective surface area of the cathode 16, thereby increasing the area for collecting electrons, and ionizing oxygen.

Instead of LSM, the matrix 20 may alternatively be made of any suitable electronic or mixed (electronic and ionic) conductive porous solid state material. When made from an electronic conductive material (e.g. metal), the matrix 20 can carry electricity by electron transportation. When made from a mixed conductor material (e.g. LSM or metal/ceramic composite), the matrix 20 can carry electricity by electron and ion transportation. When made from an ionic conductor material (e.g. Yittria-doped zirconia), the matrix 20 can carry electricity by ion transportation. Suitable alternative materials for the matrix include: doped $LaCrO_3$ (e.g. $La_{1-x}Sr_xCrO_3$, $La_{1-x}Ca_xCrO_3$, $La_{1-x}Mg_xCrO_3$, $LaCr(Mg)O_3$, $LaCa_{1-x}Cr_yO_3$), stainless steel (e.g. 316, 316L), cermets such as: Ni-Yittria stabilized zirconia, Ni and doped zirconia cermet, Ni doped—$CeO_2$ cermet, Cu doped-ceria cermet, silver-(Bi—Sr—Ca—Cu—O)-oxide cermet, silver-(Y—Ba—Cu—O)-oxide cermet; silver-alloy-(Bi—Sr—Ca—Cu—O)-oxide cermet; silver-alloy-(Y—Ba—Cu—O)-oxide cermet; silver and its alloys, Inconel steel or any super alloy, ferritic steel, SiC, and MoSi$_2$. Alternatively, when the outer surface of the fuel cell is the anode 14, the matrix 20 can be made from Ni/YSZ, Ni/tri- or divalent cation doped cerium oxide, cermet, Ni, Cu, or Cu/YSZ, Cu/tri- or divalent cation doped cerium oxide.

When the matrix 20 is made entirely of steel or a superalloy, it serves to provide mechanical support to hold the single cells together, as well as to serve as a current collector. If the matrix 20 is made of a steel or a superalloy coated with a catalyst, it serves to provide mechanical support, collect current, and promote chemical reactions, such as ionization. If the matrix 20 is made of a steel or a superalloy coated with catalyst and an ionic or mixed conductor, it serves to provide mechanical support, collect current, promote chemical reactions, and provide an ionic conduction path.

The matrix 20 is porous (with channel-type connected pores) to allow the flow of oxidant through the stack 10, and to the outer cathode layer 16 of each fuel cell 12 (in an embodiment where the outer layer is the anode 14, the matrix 20 has sufficient porosity to allow the flow of a fuel to the anode 14). The porosity of the matrix 20 is selected to provide a sufficient oxidant flow-through rate and sufficient mechanical strength to serve as a support structure for the fuel cell stack 10. In this connection, the matrix 20 has a porosity of between 25 to 95% and more preferably about 60%. The matrix 20 in this embodiment is a solid foam made by sintering a foam slurry having a foaming agent. Alternatively, other structures may be substituted for the matrix 20, such as metal wire wrapped around each fuel cell 12, a wool made of metal, ceramic, or cermet in which the fuel cells are embedded, or a fibrous bundle comprised of a plurality of entangled fibres visually resembling "cotton candy" (not shown).

Figure 2:
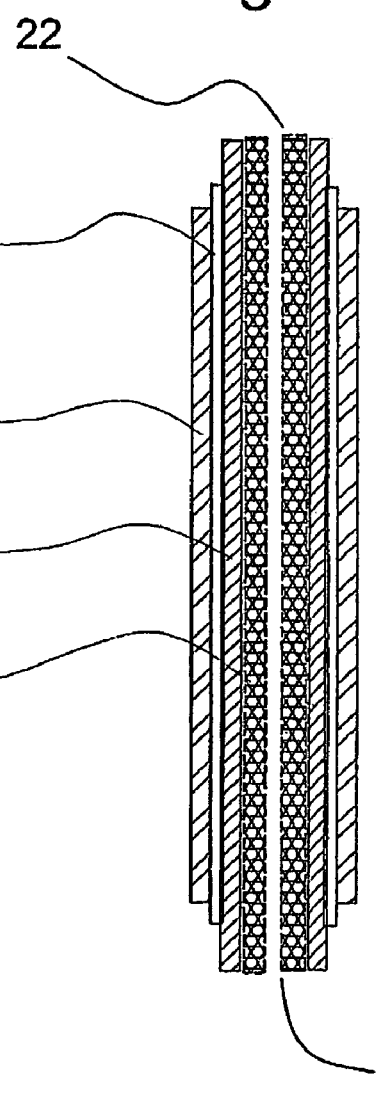
FIG. 2 is a schematic longitudinal section view of a tubular SOFC having a porous matrix structure lining the inside of the fuel cell.

Optionally, and referring to FIG. 2, the fuel cell 12 may be lined on its inner surface with a porous electrically conductive anode matrix 21. The anode matrix 21 serves to enhance anode catalytic activity and current collection. The anode matrix 21 may be made from the following materials:

Porous metal, e.g. silver, nickel, copper, stainless steel, superalloy. Main function: collect current.

Porous metal covered with catalyst. Main functions: collect current, promote chemical reaction.

Porous metal coated with catalyst and ionic or mixed conductor. Main functions: collect current, promote chemical reaction, provide ionic conduction path.

Anode materials, e.g. nickel/zirconia cermet, wherein the cermet has a higher porosity than an anode layer, the porosity being sufficient to provide a fuel gas flow path. Main functions: collect current, promote chemical reactions, provide ionic conductive path.

The fuel cell 12 in this embodiment is an elongate cylindrical tube, but it is to be understood that it is within the scope of the invention for the fuel cell 12 to have other cross sectional or longitudinal shapes; for example, the fuel cell 12 may have a "U" shape or a coil shape. For elongate circular cross-sectional tubes, the fuel cell 12 may be open at both ends, as shown in FIGS. 1 and 2, or may be closed at one end, as shown in FIG. 3. If open at both ends, fuel is fed through an inlet end 22 of the fuel cell 12 and is electrochemically reacted as it travels along the length of the tube. Unreacted fuel and reaction products are discharged at an opposite outlet end 24 of the fuel cell 12. For fuel cells open only at one end, a feed tube 26 made out of a metal such as nickel, stainless steel, or a superalloy that can withstand SOFC operating conditions is embedded in the anode matrix 21, and has an inlet 28 for receiving fuel and an outlet 29 near the bottom of the closed end of the fuel cell 12. The tube 26 serves to deliver gas as well as collect current. Fuel is fed into the feed tube inlet 28 and travels downwards to the bottom of the feed tube 26, wherein it is discharged at the outlet 29 for upward travel towards the top of the tube; as the fuel travels upwards, it is electrochemically reacted at the anode 14. Unreacted fuel and reaction products are discharged at the top of fuel cell 12, i.e. at the open end of the fuel cell 12. Alternatively, the feed tube 26 may be made of ceramic material (e.g. alumina) and that outside of the tube is coated with an electronically conductive material, the material being selected to withstand SOFC operating conditions. Such a feed tube 26 serves to deliver gas well as collect current.

One or both ends of the anode layer can be electrically connected to an external circuit for transmitting current. However, to reduce the $I^2R$ losses during current collection, a series of current collector tabs 30 are interspersed along the length of the fuel cell 12. Referring to FIGS. 4 and 5, these tabs 30 are spaced along the length of fuel cell 12 to reduce the electrical path length, thereby reducing losses. The tabs 30 are a silver or other inert metal coating on an exposed anode layer portion that is suitable for use under SOFC operating conditions. The tabs 30 are produced as follows: after the electrolyte layer 18 has been deposited on the anode layer 14, but prior to applying the outer cathode layer 16 to the electrolyte 18, and prior to sintering the electrolyte 18, a section of the electrolyte layer 18 is removed to expose a portion or the inner anode layer 14. The electrolyte layer portion can be removed when dry by using abrasive paper, cotton, etc. or be removed before completely dry by gently rubbing with wet or dry cotton, paper, etc. After sintering the anode and electrolyte layers 14, 18, the exposed anode portion is coated with silver paint (or any other electrically conductive material). The coating is applied such that the tab opening is made gas impermeable. Then, a drying and sintering step is applied to bond the silver to the exposed anode surface. Then, the outer cathode layer 16 is applied to the electrolyte 18, and the tab-bearing fuel cell 12 is sintered at between 700 and 1300 EC.

Figure 6:
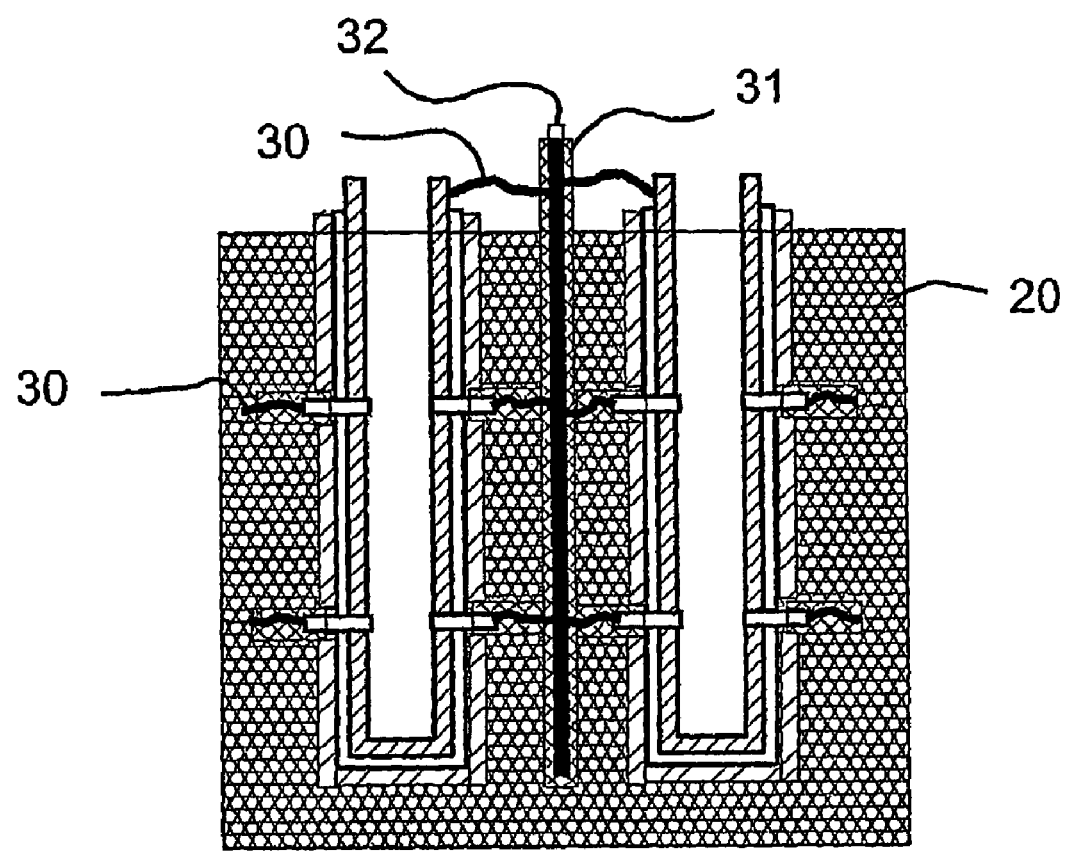
FIG. 6 is a schematic sectional side view of a pair of tubular SOFC and an anode current collector rod embedded in a porous matrix.

The fuel cell 12 may be embedded with other fuel cells 12 in the matrix 20 to form the fuel cell stack 10. In one optional embodiment as shown in FIG. 6, also embedded in the matrix 20 is an anode current collector rod 32. The collector rod 32 is made from a suitable material that is electrically conductive and able to withstand SOFC operating conditions; suitable materials include stainless steel, superalloy, and silver. The collector rod 32 is electrically coupled to the anode tabs 30. The collector rod 32 is connectable to an external circuit (not shown) to conduct the current collected from the tabs 30 to the external circuit. The tabs 30 and rod 32 are wrapped in an electrical insulator 31 to electrically separate the tabs 30 and rod 32 from the cathode 16 and the portion of the matrix 20 electrically contacting the cathode 16.

Figure 7:
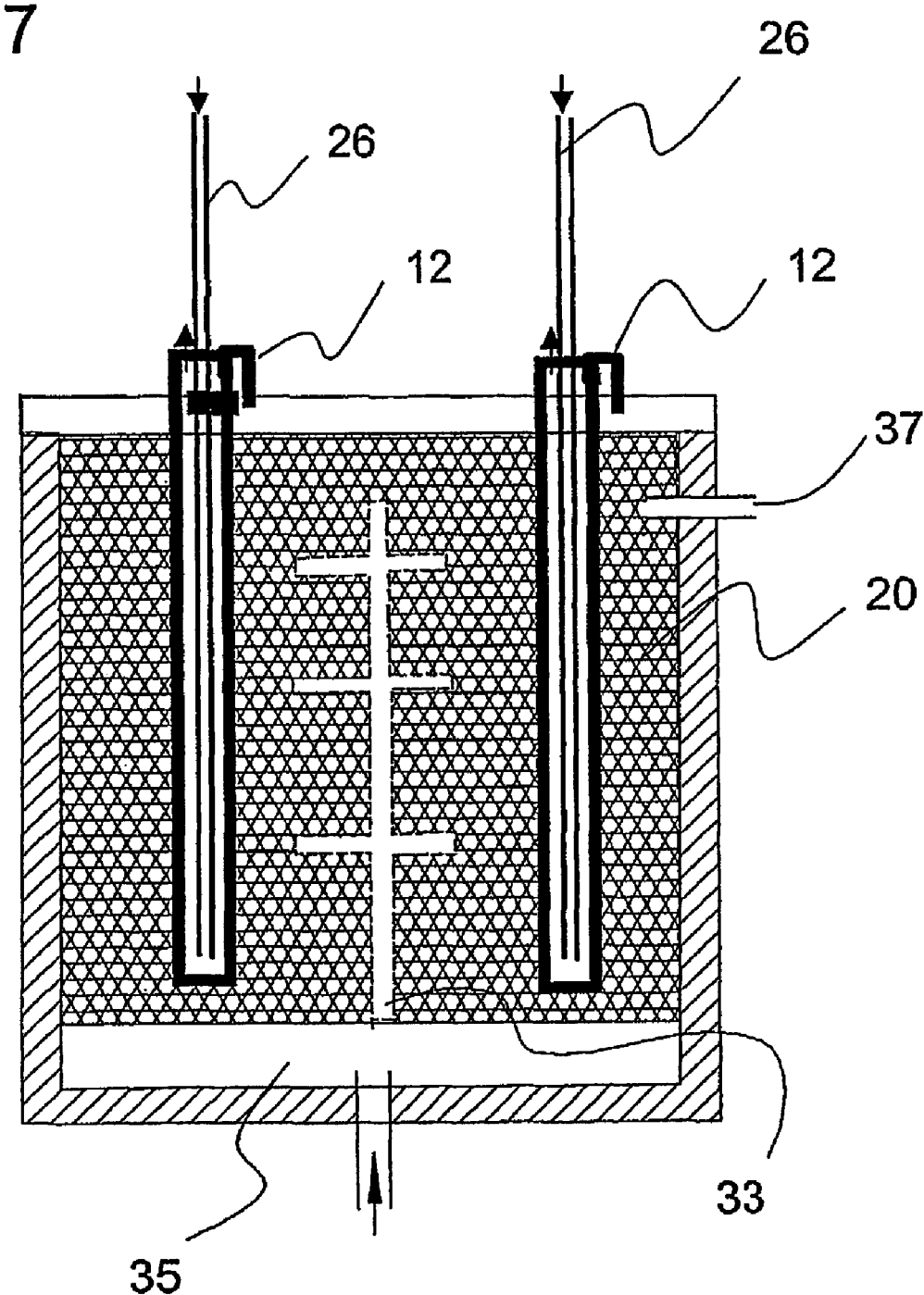
FIG. 7 is a schematic sectional side view of a fuel cell system having a pair of tubular SOFC embedded in a porous matrix that has branched oxidant delivery channels.

Referring to FIG. 7, the matrix 20 may optionally have a number of oxidant distribution channels 33 that serve to enhance the transmission of oxidant/air to the cathode 16 of each fuel cell 12. Such distribution channels 33 may be formed by inserting elongate combustible cores in the matrix material during formation of the matrix 20, then combusting away the cores to leave elongate voids in the matrix 20. Oxidant or air may be supplied to the distribution channels 33 via a diffuser 35; such diffuser 35 may extend transversely at one end of the stack in the matrix 20 and have an inlet connected to an oxidant source and perforations to discharge oxidant or air into the matrix 20 in addition to discharging oxidant or air into the distribution channels 33. Used oxidant and reaction products are discharged through outlet 37.

Figure 8:
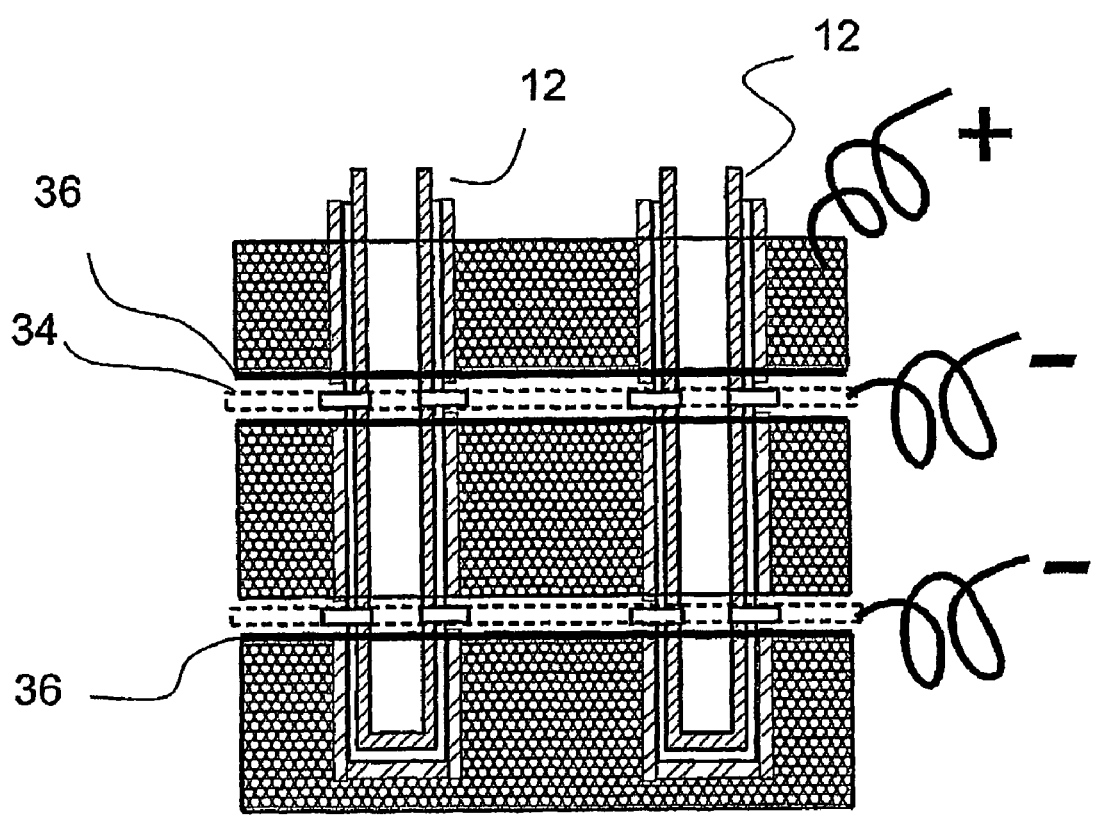
FIG. 8 is a schematic sectional side view of a pair of fuel cells embedded in a porous matrix and attached to a transverse anode current collector plate.
Figure 9:
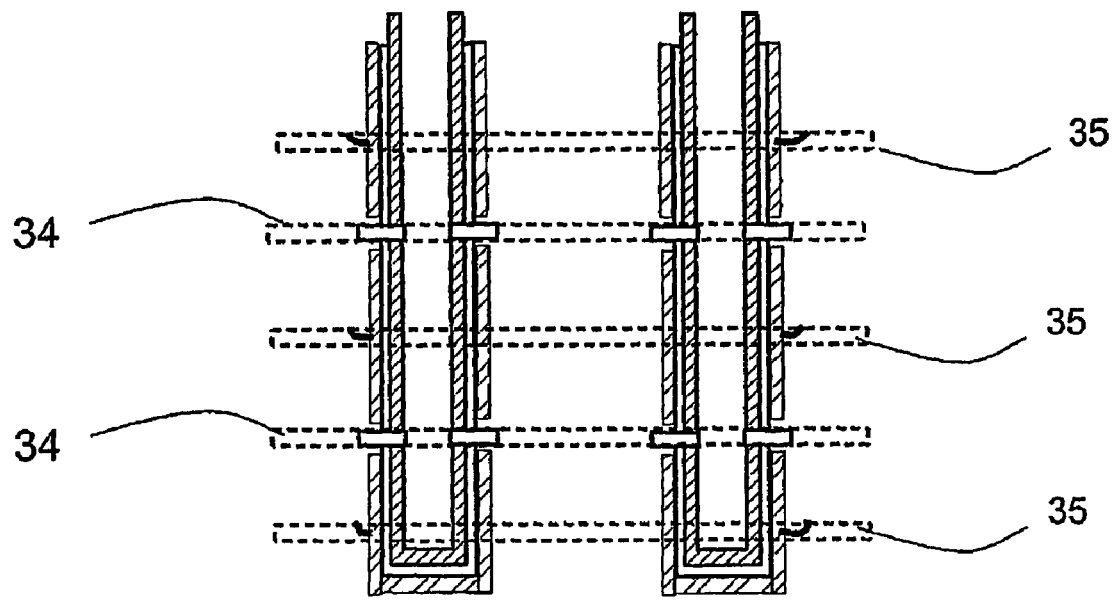
FIG. 9 is a schematic sectional side view of a pair of fuel cells attached to transverse anode current collector plates and transverse cathode current collector plates.
Figure 10:
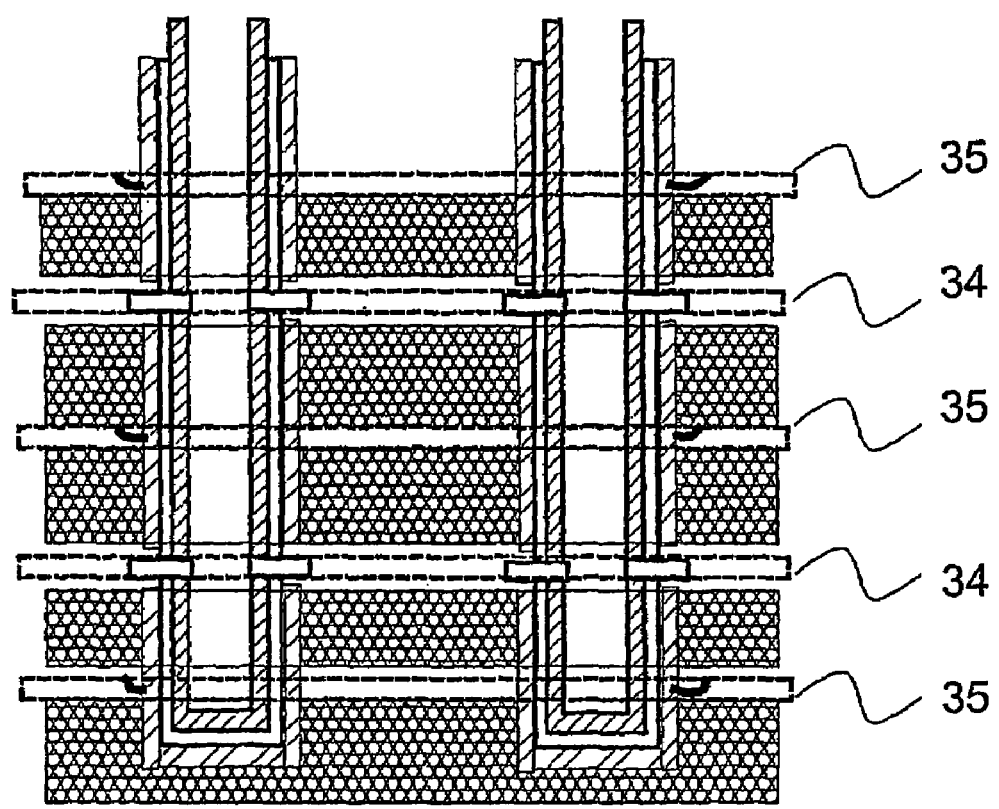
FIG. 10 is a schematic sectional side view of a pair of fuel cells attached to transverse anode current collector plates and transverse cathode current collector plates and embedded in a porous matrix.

Referring to FIGS. 8 to 10, an alternative approach is illustrated for collecting current from the anode of each fuel cell 12. In this alternative embodiment, a series of anode current collection plates 34 are attached to the tabs 30 such that the plates 34 extend transversely from the length of each fuel cell 12. The plates 34 are made from a suitable material that is electrically conductive and able to withstand SOFC operating conditions; suitable materials include stainless steel, superalloy, and silver. The plates 34 have spaced openings (not shown) for receiving each fuel cell 12 and perforations to allow air/oxidant gas to flow through the plates 34. The plates 34 serve to collect current from the tabs 30 and transmit the current to an external electrical circuit (not shown) connected to the outside edges of the plates 34. The plates 34 may also be constructed with such properties and be physically attached to each fuel cell 12 in such a manner that the plates 34 provide structural support to the fuel cells 12 that complements the support provided by the matrix 20 (as in FIGS. 8 and 10). The plates 34 are electrically isolated from the matrix 20 by a porous electrical insulator layer 36 that covers both surfaces of each plate 34; the matrix 20 thus are physically and electrically coupled only to the cathodes 16 of each fuel cell 12 whereas the plates 34 are physically and electrically coupled only to the anodes 14 of each fuel cell 12.

Alternatively, and as shown in FIG. 9, transverse plates serve to provide the entire structural support for the fuel cells 12, i.e. the plates replace the matrix 20. In such case, cathode plates 35 are provided that physically and electrically connect to the cathode 16 of each fuel cell 12. Like the anode plates 34, the cathode plates 35 are made from a suitable material that is electrically conductive and able to withstand SOFC operating conditions, and have spaced openings to receive fuel cells 12 and perforations to allow the transmission of oxidant/air gas therethrough. The cathode plates 35 are electrically connected to the external circuit to return current conducted through the external circuit back to the cathode 16 of each fuel cell 12 for the electrochemical process.

Referring to FIGS. 11 to 25, a plurality of fuel cells 12 can be assembled into a stack 10 to produce commercially useful electrical power levels. These figures show stack configurations that are particularly suitable for certain performance requirements.

Referring to FIG. 11, the fuel cell stack 10 can comprise a plurality of fuel cells 12 embedded in the matrix 20. Each of the fuel cells 12 in this stack 10 are electrically connected in parallel, since the matrix 20 is electrically conductive and is electrically coupled to the cathode 16 of each of the fuel cells 12 in the stack 10. As a result, the effective voltage of the stack 10 is equal to the voltage of the single fuel cell 12 in the stack 10 with the highest voltage and the effective current of the stack 10 is the additive sum of the current produced by each fuel cell 12.

Another stack configuration is shown in FIG. 12. Here, the fuel cell stack 10 comprise a mixture of individual fuel cells 12 and fuel cell sub-stacks 40 all embedded in the matrix 20. A fuel cell sub-stack 40 is one or more fuel cells 12 that are electrically isolated from other fuel cells 12 in the stack 10 in such a manner that the sub-stack 40 can be electrically connected in series with other sub-stacks 40 or fuel cells 12 in the stack 10. Each sub-stack 40 is encased within an electrical or a thermal and electrical insulator 42. The insulator 42 prevents the matrix 20 inside the sub-stack 40 ("sub-stack matrix") from electrically contacting the matrix 20 outside the sub-stack 40 ("stack matrix"), thereby preventing the fuel cells 12 inside the sub-stack 40 from short-circuiting with other fuel cells 12 or sub-stacks 40 in the stack 10. Current may be collected from the ends of each fuel cell 12.

The insulator 42 is a flexible sheet that wraps around the sub-stack 40; the sheet extends the length of the fuel cells 12, and may be made of $Al_2O_3$ (dense or porous), ceramic felt, or a composite material of an exterior metal shell with an interior insulating ceramic lining. Alternatively, the insulator 42 may be a rigid two-layered shell having an exterior ceramic layer and an interior conducting metal lining.

Another stack configuration is shown in FIG. 13. Here, a stack 44 comprises a plurality of small diameter tubular fuel cells 12 embedded in the matrix 20 in a parallel electrical connection like that shown in FIG. 11. However, this stack configuration differs from that shown in FIG. 11 in that the small-diameter fuel cells 12 ("inner fuel cells") are located within a large-diameter tubular fuel cell 13 ("outer fuel cell"). The outer fuel cell 13 may be made from the same materials and by the same method (described below) as the inner fuel cells, or by materials and techniques known in the art for making large-diameter fuel cells, e.g. by extrusion. The outer fuel cell 13 differs from the inner fuel cells 12 in that the inner electrode layer is the cathode 16 and is physically and electrically connected to the matrix 20, and the outer electrode layer is the anode 14. A container 46 contains the outer fuel cell 13 in such a manner that space is provided between the container inner wall and the anode surface of the outer fuel cell 13 thereby creating a fuel delivery channel 48 for flowing fuel to the anode of the outer fuel cell 13. Spacers (not shown) may be provided to affix the stack 10 to the container 46.

The fuel cell stack 50 shown in FIG. 14 is the same as the stack 44 in FIG. 13 except that porous matrix material is substituted for the spacers in the fuel delivery channel 48.

If the container 46 is removed from the fuel cell stacks 10 of FIGS. 13 and 14, the stacks 10 resemble a "tube-within-a-tube" fuel cell assembly, and can replace large diameter tubular fuel cells used in known fuel cell systems. Because of the plurality of small diameter fuel cells 12 within the large diameter fuel cell 13, a tube-within-a-tube fuel cell assembly is expected to provide a higher power output than a conventional single tubular large-diameter fuel cell.

FIGS. 15 and 16 illustrate another pair of stack configurations 52, 54. Essentially, these are additional tube-within-a-tube designs; however, here, the small-diameter fuel cells 12 are arranged in the same manner as that shown in FIG. 12. The stack 10 shown in FIG. 15 is attached to the container 46 by spacers, and the stack 10 shown in FIG. 16 is attached to the container 46 by the porous matrix material.

FIGS. 17 and 18 illustrate another tube-within-a-tube fuel cell assembly 56, 58. Tube-within-a-tube fuel cell assemblies 56, 58 comprise a plurality of small-diameter fuel cells 12 and fuel cell sub-stacks 60 arranged in generally the same manner as shown in FIGS. 15 and 16. However, the sub-stacks 60 in this configuration differ from the sub-stacks 40 shown in FIGS. 15 and 16: instead of an insulator 42 surrounding the fuel cells 12, each sub-stack 60 is enclosed inside an intermediate-diameter fuel cell 15 that has a smaller diameter than the large-diameter outer fuel cell 13, and a larger diameter than the small-diameter inner fuel cells 12.

Figure 19:
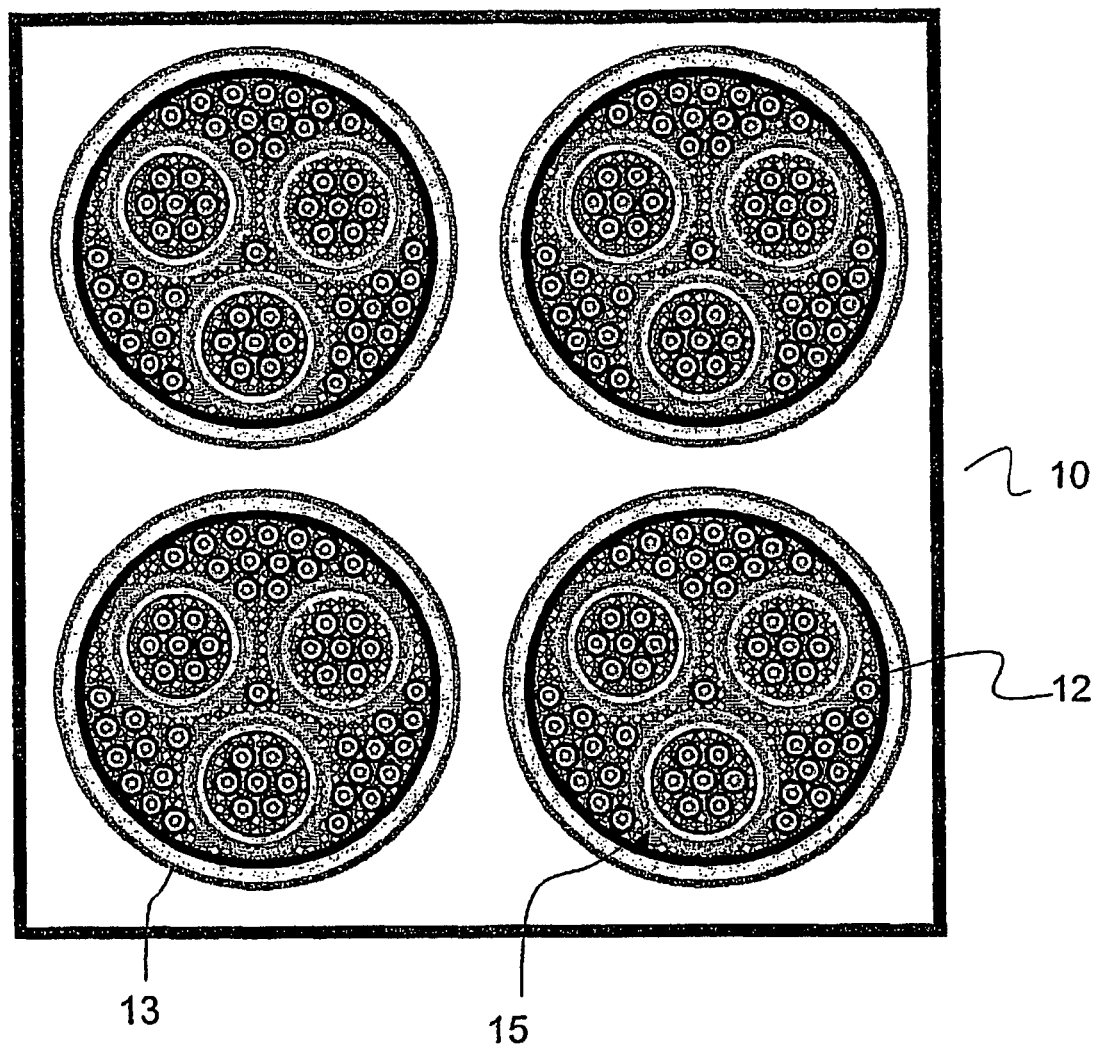
FIG. 19 is a schematic end view of a fuel cell system comprising a plurality of the fuel cell stacks of FIG. 17.
Figure 20:
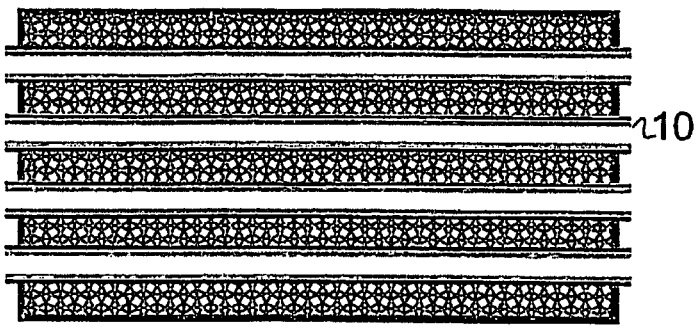
FIG. 20 is a schematic sectional longitudinal view of a fuel cell stack having a plurality of inner tubular fuel cells embedded in a porous, foam-like matrix.

The fuel cell stacks 56, 58 are located inside the container 46 in the same manner as the stacks 52, 54 respectively. Alternatively, the stacks 56, 58 without the container 46 may serve as tube-within-a-tube fuel cell assemblies and be assembled with other stacks in a conventional large-diameter tubular fuel cell system as discussed above. FIG. 19 shows a stack of the fuel cell assemblies of FIGS. 17 and 18 arranged in series, or in parallel inside a larger thermal enclosure.

Figure 21:
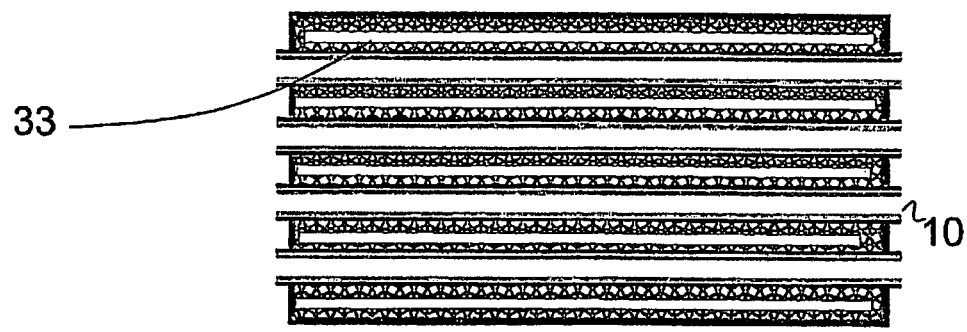
FIG. 21 is a schematic sectional longitudinal view of the fuel cell stack of FIG. 20 having a plurality of longitudinal fluid flow channels in the matrix.
Figure 22:
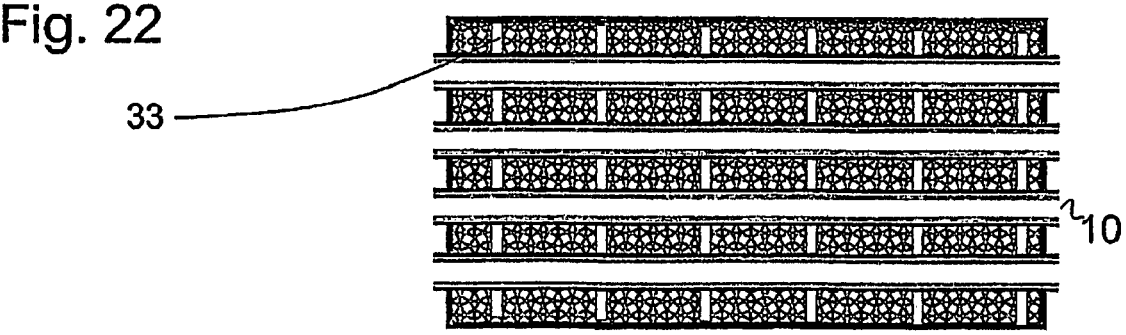
FIG. 22 is a schematic sectional longitudinal view of the fuel cell stack of FIG. 20 having a plurality of transverse fluid flow channels in the matrix.
Figure 23:
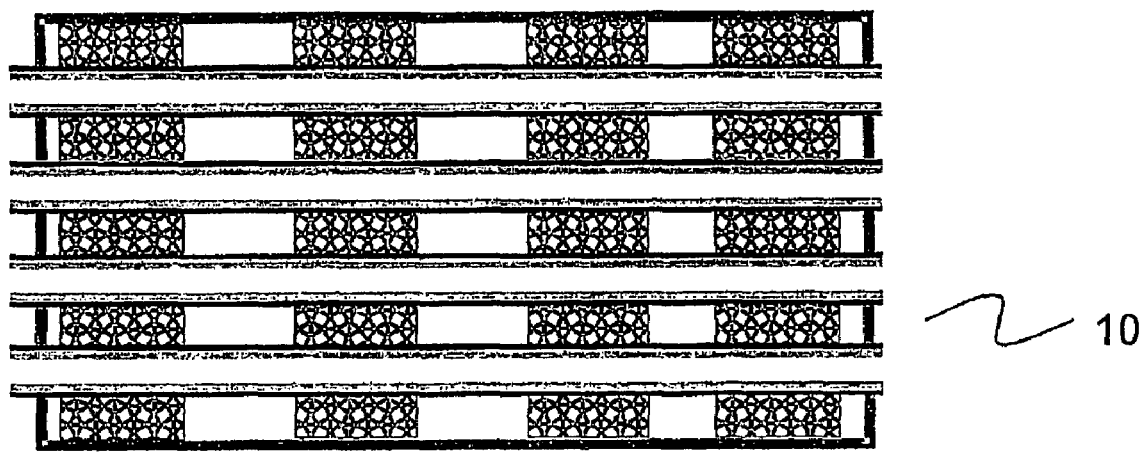
FIG. 23 is a schematic sectional longitudinal view of a fuel cell stack having a plurality of tubular fuel cells embedded in a discontinuous porous foam-like matrix.
Figure 24:
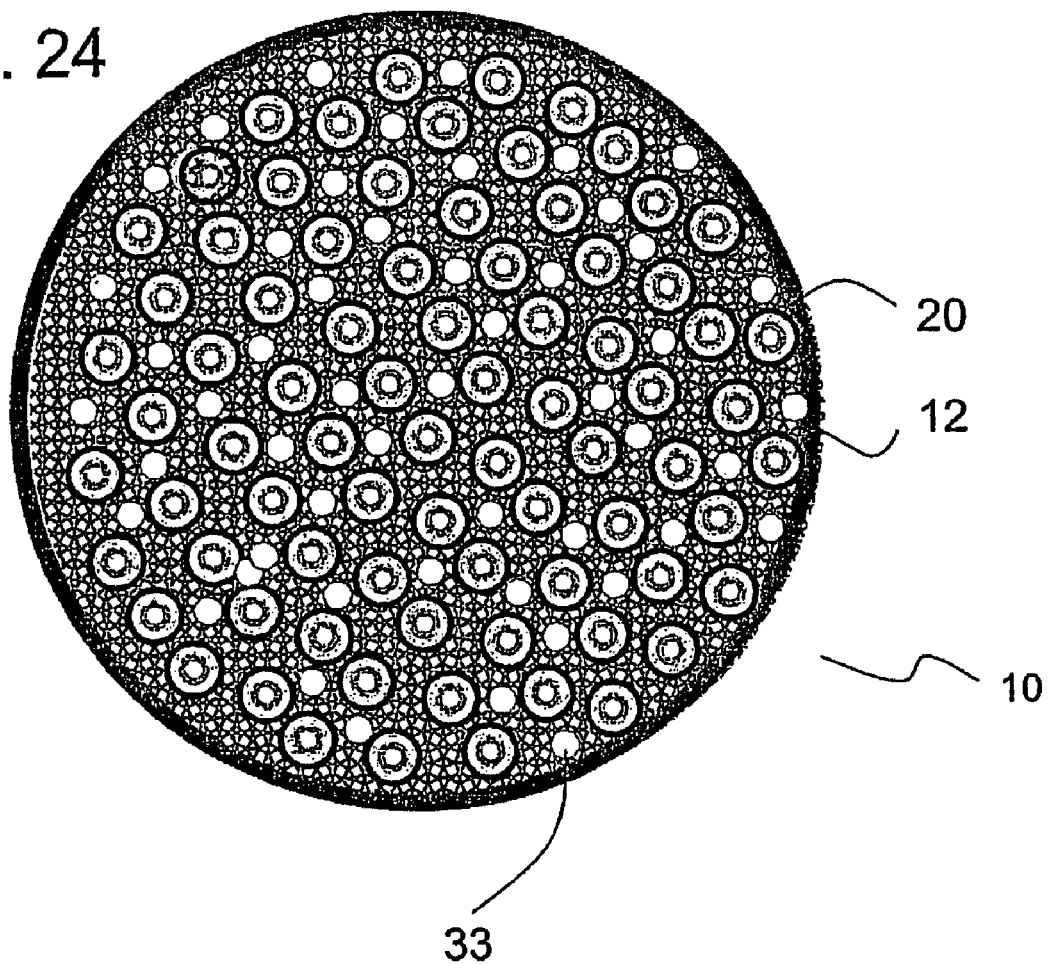
FIG. 24 is a schematic end view of a fuel cell stack having a plurality of tubular fuel cells embedded in a porous, foam-like matrix and a plurality of longitudinal fluid flow channels in the matrix.

Referring to FIGS. 20–24, the small-diameter fuel cells 12 extend the length of the stack 10 such that the ends of each inner fuel cell 12 are open at each end of the stack 10 and are free of matrix material, and can be electrically connected to the external circuit. Referring to FIGS. 21 and 22, the matrix 20 can be provided with distribution channels 33 that enhance the flow of reactant through the matrix 20 and to the electrode surface of each small-diameter fuel cell 12 (as shown also in FIG. 7); FIG. 21 shows a series of longitudinal distribution channels 33 substantially parallel with the small-diameter fuel cells 12 (see also FIG. 24), and FIG. 22 shows a series of transverse distribution channels 33 that are perpendicular to the small-diameter fuel cells 12. As will be discussed below, these channels 33 can be formed by inserting combustible members that burn away during a sintering treatment to leave behind the channels 33, or, can be formed from the gaps left by a porous matrix structure that is discontinuous along the length of the fuel cells 12, as shown in FIG. 23. A plan view of a series of longitudinally extending channels 33 interspersed within the fuel cells 12 is shown in FIG. 24.

Figure 25:
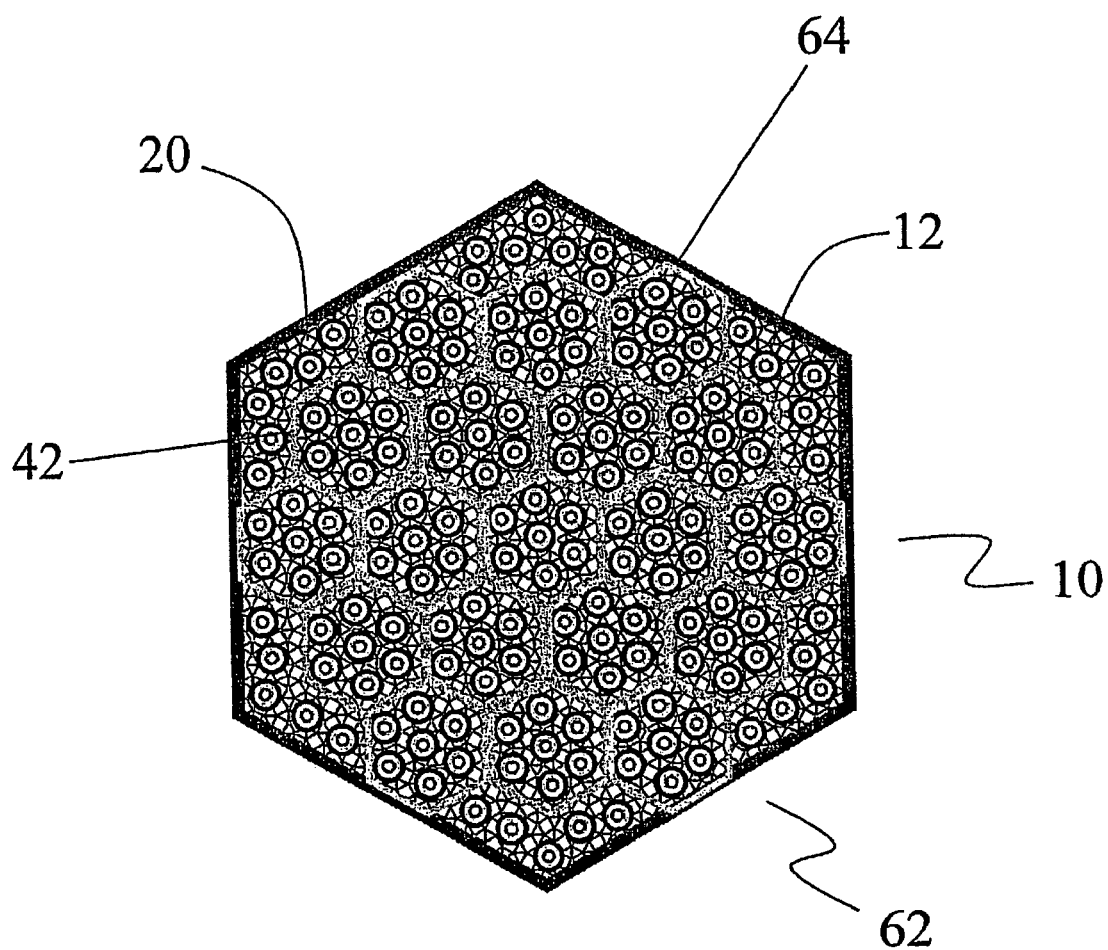
FIG. 25 is a schematic end view of a fuel cell stack having a plurality of hexagonal sub-stacks each having a plurality of tubular fuel cells therein.

Referring to FIG. 25, a hexagonal-shaped fuel cell stack 62 is provided having 25 sub-stacks 64. Each sub-stack 64 has 7 single fuel cells 12. As an illustrative example, when each fuel cell 12 is rated at 0.7 V, 1.43 A and 1 W, each 7 cell sub-stack 64 produces 7 W. As the single cells in the 7 cell sub-stack 64 are connected in parallel, the voltage output from the sub-stack 64 equals the voltage from a single cell 12, i.e. 0.7V, and the current will be additive sum of the current produced by each cell 12, i.e. 1.43×7=10 A.

Given that the sub-stacks 64 are electrically insulated from each other, the stack 62 can be electrically connected in different ways to produce different outputs. The electrical connections are established at the ends of each cells, and are known in the art.

In one embodiment, all 25 sub-stacks 64 can be connected in parallel, and in such case,

| stack power | 7 W × 25 sub-stacks = 175 W |
|---|---|
| stack voltage | 0.7 V |
| stack current | 10 A × 25 sub-stacks = 250 A |

In another embodiment, the stack 62 may be divided into 5 electrically isolated sub-groups, each group having 5 sub-stacks. The 5 sub-stacks in each group are connected in parallel, and the 5 groups are connected in series. In such case, each sub-stack produces 7 W, 0.7V and 10 A, each group produces 35 W, 0.7V and 50 A, and

| stack power | 35 W × 5 groups = 175 W |
|---|---|
| stack voltage | 0.7 V × 5 groups = 3.5 V |
| stack current | 50 A |

In another embodiment, the 5 sub-stacks in each group are connected in series, then for each group, the power output is 35 W, voltage is 3.5V and the current is 10 A. If the groups are connected in series,

| stack power | 35 W × 5 groups = 175 W |
|---|---|
| stack voltage | 3.5 V × 5 groups = 17.5 V |
| stack current | 10 A |

If the groups are connected in parallel,

| stack power | 35 W × 5 groups = 175 W |
|---|---|
| stack voltage | 3.5 V |
| stack current | 175 W/3.5 V = 50 A |

FIGS. 26 to 30 show various fuel cell system designs that incorporate one of the fuel cell stack configurations as described above. Generally speaking, the fuel cell system includes oxidant and fuel delivery and discharge means, the fuel cell stack, a thermal enclosure for the stack, and electrical leads for connecting the stack to an external electrical circuit.

Figure 26:
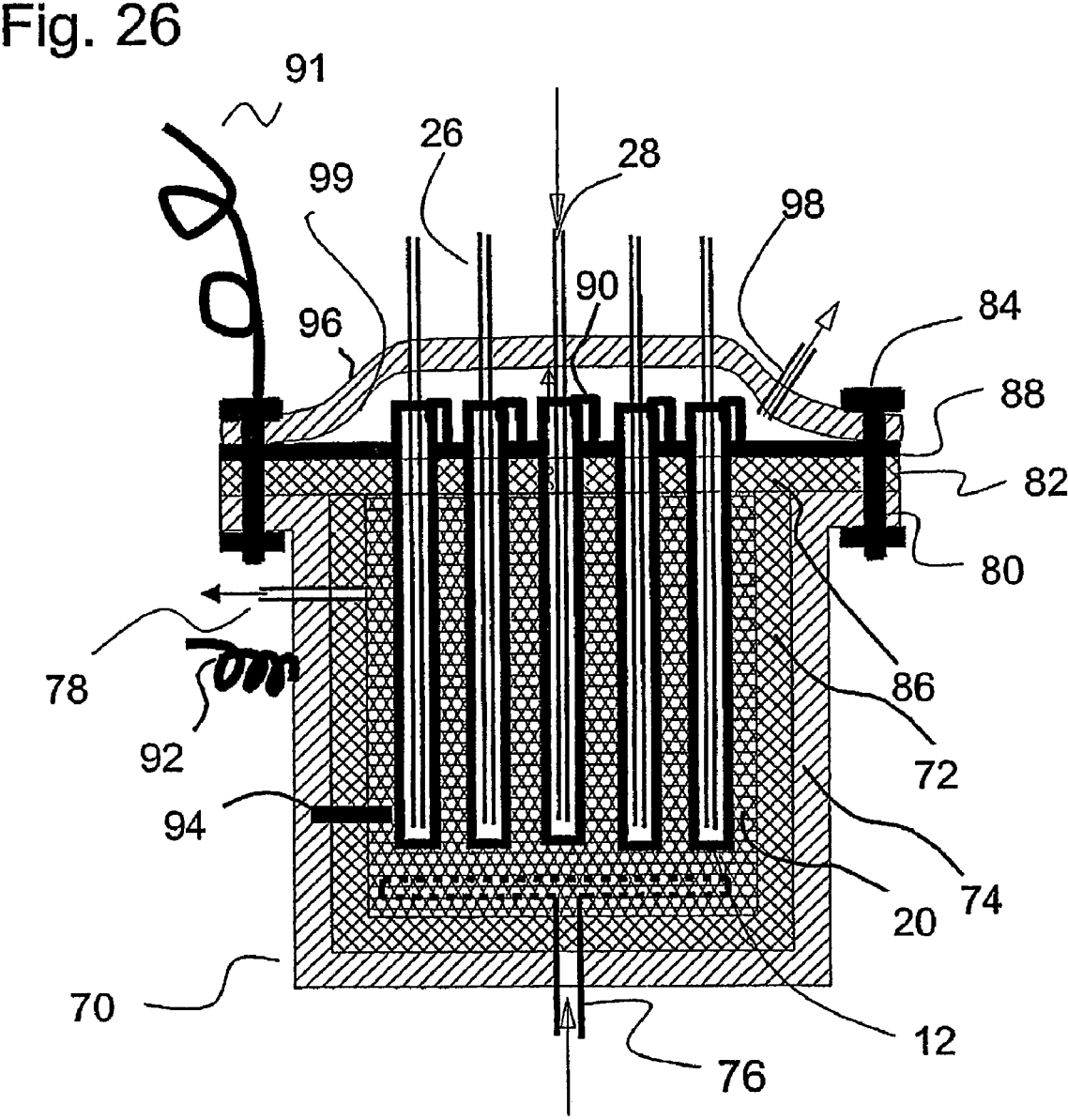
FIG. 26 is a schematic sectional side view of a fuel cell system having a stack of tubular SOFCs each closed at one end and having an oxidant inlet channel at the bottom of the system.

FIG. 26 illustrates a simple fuel cell system 70 design having a stack 10 of one-ended fuel cells 12 embedded in the matrix 20. The stack 10 is contained inside a cup-shaped thermal insulator layer 72 made of a suitable ceramic material such as aerogel or another like porous ceramic, ceramic felt or another like fibrous ceramic such as Saffil. The stack 10 and insulator layer 72 are contained inside a cup-shaped casing 74. A suitable material for the casing 74 is a ceramic such as alumina, zirconia, alumina-zirconia composite, spinel, silica, ceramic aerogel, or porous ceramics where the pores are disconnected. The casing 74 may have two layers wherein the outer layer is made of a steel or aluminum, and the inner layer is made of ceramic. Air inlet and outlet conduits 76 and 78 are provided through the insulator 72 and casing 74 for the delivery of air/oxidant to and from the stack 10.

The casing 74 has an annular lip 80 that extends outwards around the periphery of the rim of the casing 74. The lip 80 enables the mounting of a lid 82 via a plurality of electrically non-conductive fasteners 84 in such a manner that a fluid seal is established between the lid 82 and the casing 74. The lid 82 has a thermal and electrical insulator layer 86 of similar construction to the insulator layer 72, and a reactant impermeable electrically conductive metal layer 88 in contiguous adjacent contact with the insulator layer 86. The metal layer 88 is electrically connected to the anode of each fuel cell 12 via anode connectors 90 and is electrically connected to an external circuit via anode lead 91. The casing 74 is electrically connected to the external electrical circuit via cathode lead 92 and electrically coupled to the cathode of each fuel cell 12 via a cathode connector 94, which is electrically connected to the casing 74 and the matrix 20.

A dome-shaped fuel discharge chamber cover 96 is fastened over the lid 82 via fasteners 84 to establish a fluid seal between the cover 96 and the lid 82. The cover 96 is provided with openings that receive the feed tube 26 of each fuel cell 12, and with a fuel discharge outlet 98. A fuel discharge chamber 99 is defined by the space inside the cover 96 and lid 82; the chamber 99 is fluidly coupled to the fuel outlet of each fuel cell 12.

In operation, fuel is fed into each fuel cell 12 of the system 70 via the inlet 28 of each fuel cell feed tube 26. Oxidant is fed into the matrix 20 via the oxidant feed tube 76. Fuel and oxidant are electrochemically reacted at the anode and cathode of each fuel cell 12, respectively. Unused fuel and reaction products exit the fuel cells 12 into the fuel discharge chamber 99 and are discharged from the fuel cell system through the fuel discharge outlet 98. Unused oxidant and reaction products are discharged through the outlet channel 78. Electrical current generated as a result of the electrochemical reactions are conducted between the electrical circuit via anode and cathode leads 91, 92.

Figure 27:
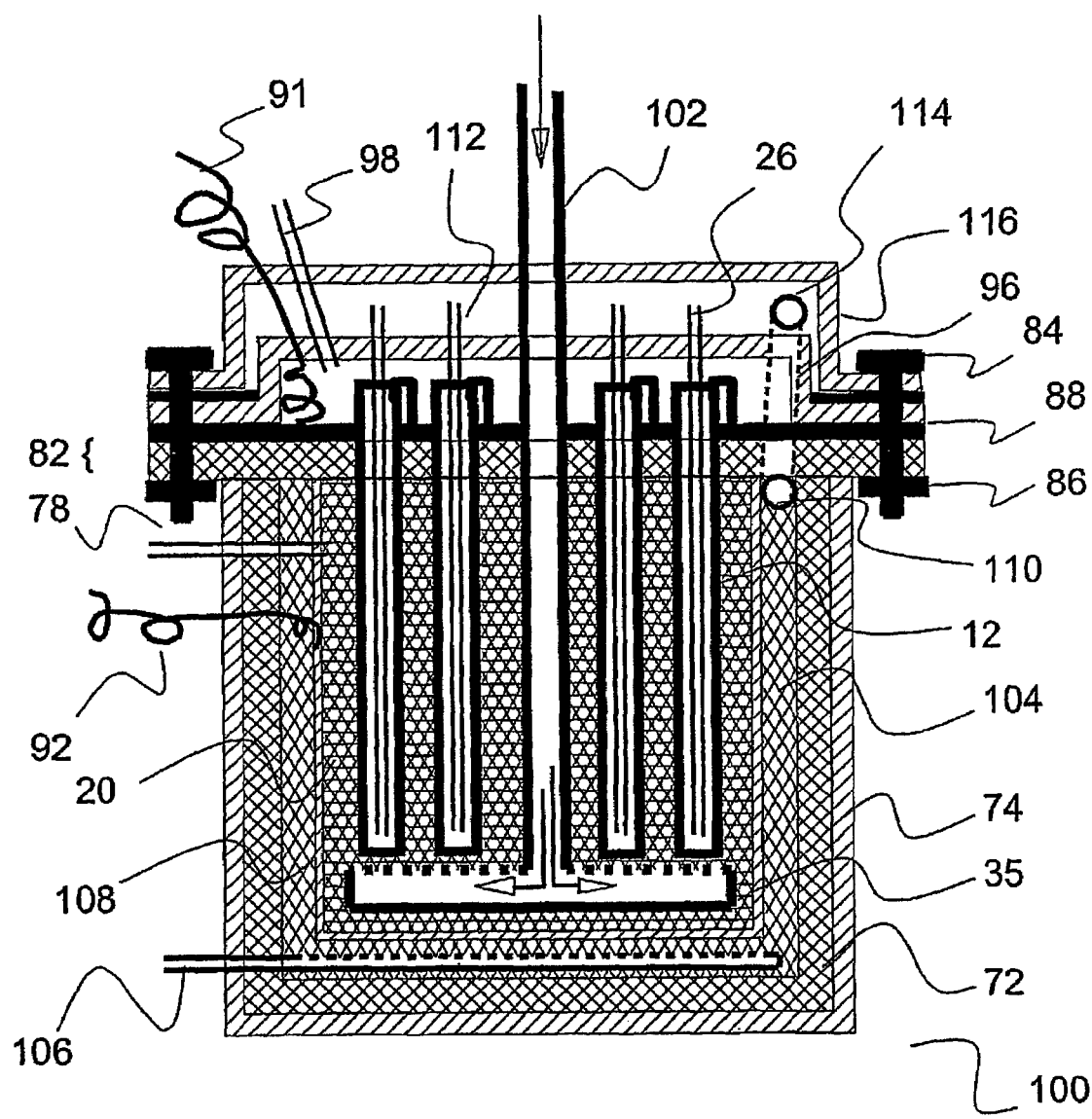
FIG. 27 is a schematic sectional side view of a fuel cell system having a stack of tubular SOFCs each closed at one end and having a fuel gas reformer surrounding the stack.

Referring now to FIG. 27, a fuel cell system 100 is provided that has a similar design to the system 70 shown in FIG. 26, except for the following notable differences. First, an air/oxidant inlet 102 extends into the matrix 20 from the top of the system 100. Second, a fuel gas reformer 104 is provided to reform a suitable supply fuel (e.g. natural gas) into hydrogen. Supply fuel is delivered to the reformer 104 via a fuel supply inlet conduit 106 fluidly coupled to the reformer 104; the fuel supply inlet conduit 106 has a discharge portion comprising a plurality of perforations that discharge fuel into the bottom of the reformer 104. The reformer 104 has a reformer chamber being the space between two cup-shaped layers, namely, the insulator layer 72 and a cup-shaped metal current-collecting layer 108. The top of the reformer chamber is closed by the lid 82. The chamber is filled with a catalyst-coated foam-like porous matrix structure. Near the top rim of the reformer 104 is a reformer outlet 110 that discharges reformed fuel from the reformer chamber into a fuel supply chamber 112 via a fuel supply conduit 114 (shown coupled to the reformer outlet 110 and in dotted line in FIG. 27). The fuel supply chamber 112 is a cavity within a dome-shaped fuel supply chamber cover 116 and the fuel discharge chamber cover 96.

The cathode current collecting layer 108 is in contiguous adjacent contact with the fuel cell stack 10, and more particularly, in electrical contact with the support structure 20. The cathode current collecting layer 108 is also electrically connected to cathode lead 92. The stack 10, cathode current collecting layer 108, reformer 104 and insulating layer 72 are all enclosed inside the outer casing 74 and lid 82.

In operation, natural gas (or another suitable hydrocarbon fuel) supply fuel is delivered to the bottom of the reformer chamber by the fuel inlet conduit 106. As the fuel travels upwards through the catalyst-coated matrix in the reformer chamber, it is reformed into hydrogen and is discharged from the reformer 104 through the reformer outlet 110 and into the fuel supply chamber 112. Hydrogen fuel in the fuel supply chamber 112 is then fed into each fuel cell 12 via the feed tube 26. Heat from the electrochemical reaction reforms the natural gas supply fuel into hydrogen; in this connection, the current collecting layer 108 is made of a material that is a good heat conductor. As the reforming process is endothermic, the reformer 104 serves an additional useful function of cooling the stack 10. The remainder of the system operation is similar to the system 70 as shown in FIG. 26.

Figure 28:
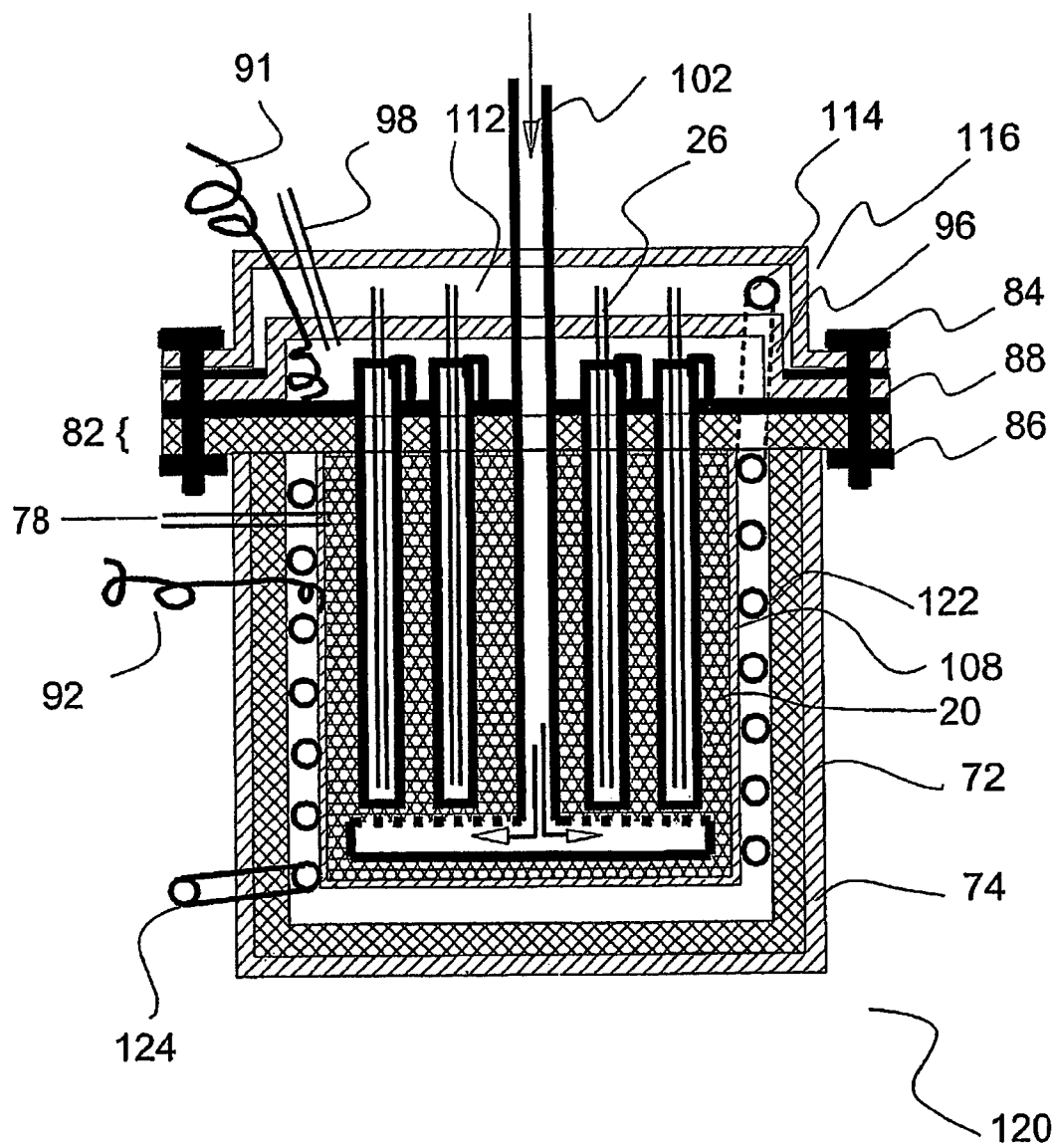
FIG. 28 is a schematic sectional side view of a fuel cell system having a stack of tubular SOFCs each closed at one end, and a fuel gas reformer tube wrapped around the stack.

Another fuel cell system 120 is shown in FIG. 28. This system 120 is similar to the system shown in FIG. 27 except that a reformer channel 122 is provided that winds around the reformer chamber. This shape is deliberately selected to lengthen the reformer pathway, thereby increasing the effectiveness of the reforming process. A fuel supply inlet 124 fluidly connected to the upstream end of the reformer channel 122 replaces the fuel supply inlet 106 shown in FIG. 27. The downstream end of the reformer channel 122 is fluidly coupled to the fuel supply chamber 112.

Figure 29:
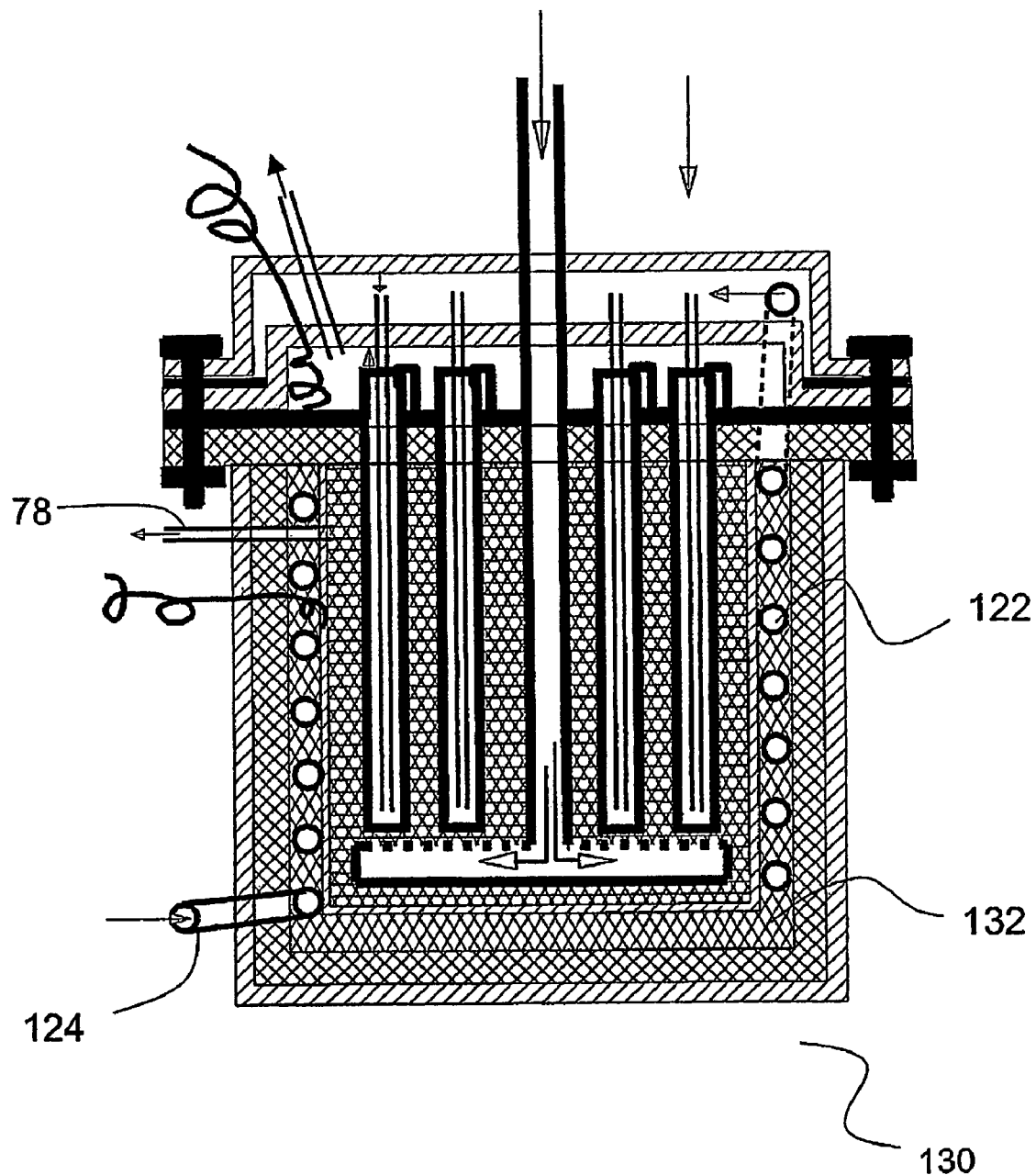
FIG. 29 is a schematic sectional side view of the system of FIG. 30 with the reformer tube embedded in a heat conductive matrix structure.

The fuel cell system 130 illustrated in FIG. 29 is identical to the system 120 illustrated in FIG. 28, except that the reformer channel 122 is embedded in a matrix material 132 to improve the heat conduction from the reformer enclosure to the reformer channel 122.

Figure 30:
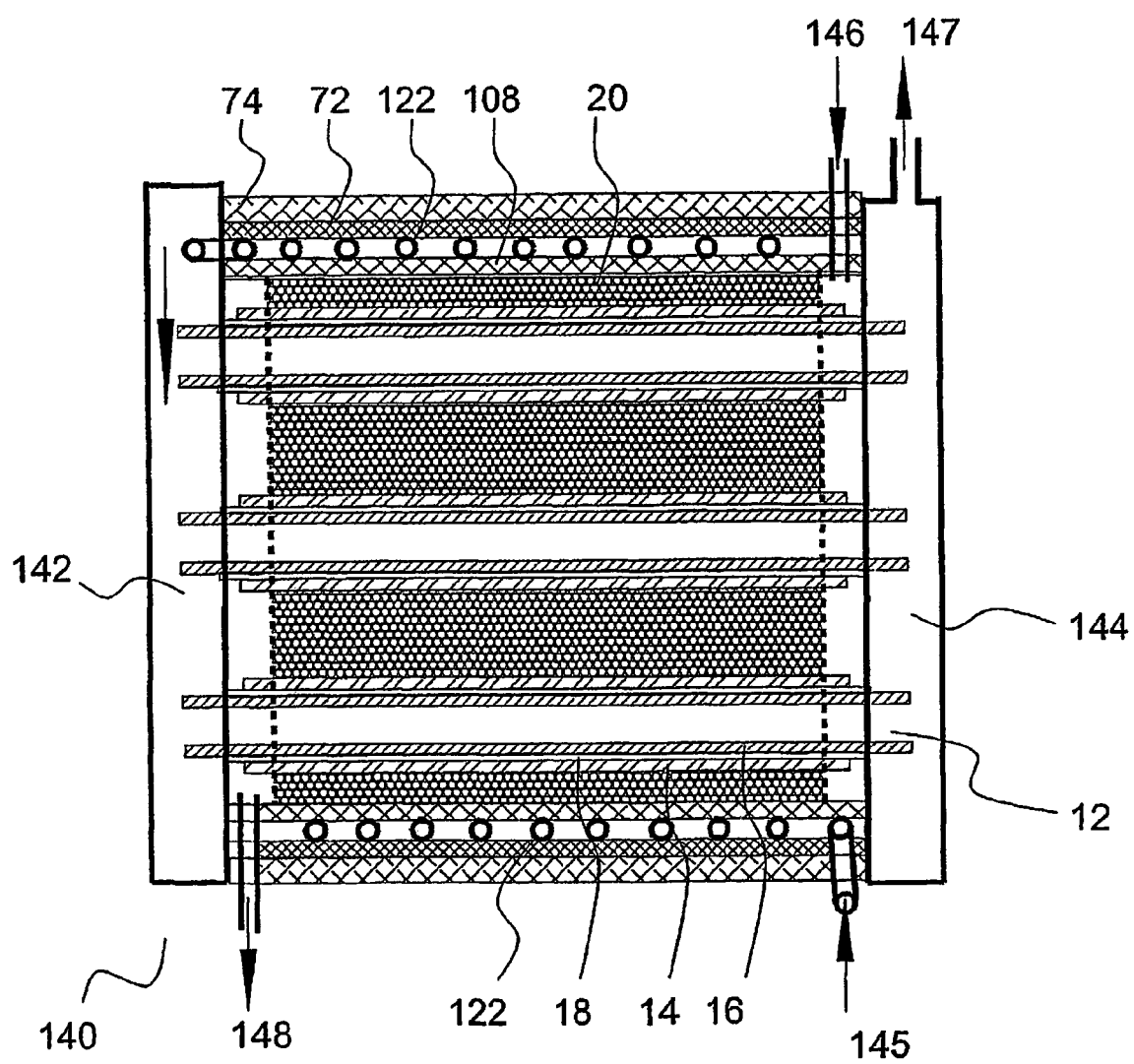
FIG. 30 is a schematic sectional side view of a fuel cell system having a stack of tubular SOFCs each open at both ends, and a fuel gas reformer tube wrapped around the stack.

FIG. 30 illustrates another fuel cell system 140 design having a stack 10 of elongate two-ended fuel cells 12 embedded in the matrix 20. The ends of the stack 10 are capped by a fuel delivery manifold 142 and a fuel discharge manifold 144. The manifolds 142, 144 have openings that receive the ends of each fuel cell 12 in the stack 10 such that a fluid seal is established between the inside of each fuel cell 12 and the respective manifolds 142, 144. This enables fuel to be delivered to and from each fuel cell 12 in fluid isolation from the oxidant pathway via inlet 145 and outlet 147. Oxidant is fed into and out of the fuel cell stack via an oxidant inlet 146, and outlet 148, respectively. The stack is surrounded by a cylindrical shaped insulator 72 and outer casing 74. Between the insulator and a metal cathode current collecting layer 108 are the spiral reformer channels 122.

Manufacture

A method of manufacturing the tubular fuel cells 12 and of embedding these fuel cells 12 in the porous matrix 20 is described in the following paragraphs.

A. Forming a Tubular Fuel Cell

As discussed above, the process for making a small diameter tubular SOFC by producing an inner electrode and electrolyte by EPD is described in Applicant's PCT application no. PCT/CA01/00634. The outer electrode layer of the fuel cell may be formed by applying a LSM layer onto the electrolyte 18 by one of dip-coating, painting as known in the art, or by EPD.

B. Producing a Stack or Sub-Stack of Fuel Cells

A plurality of fuel cells 12 can be assembled into a stack 10 or sub-stack 40 for use in a fuel cell system. To hold the fuel cells 12 in place, the fuel cells 12 are embedded in a relatively rigid but porous solid-state foam matrix 20 that serves as a support structure. When made with certain materials, the matrix 20 can also serve as part of the cathode 16, by collecting current and conducting oxygen (oxide) ions to the electrolyte 18.

Figure 31:
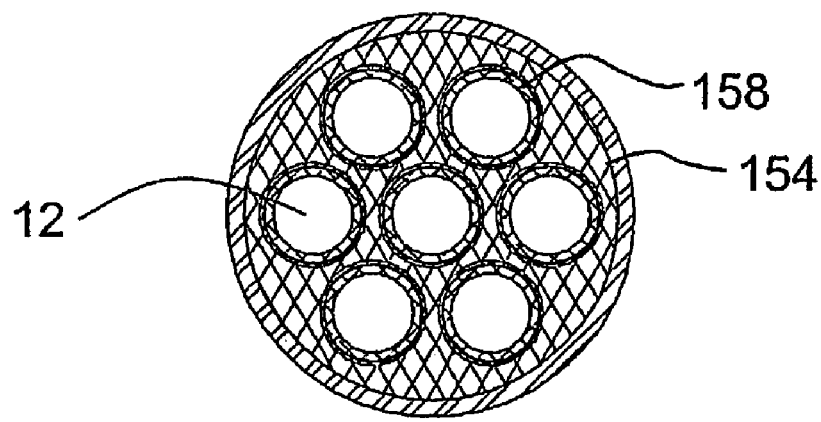
FIGS. 31 and 32 are schematic top and side views of an apparatus for embedding a group of fuel cells in the matrix.
Figure 32:
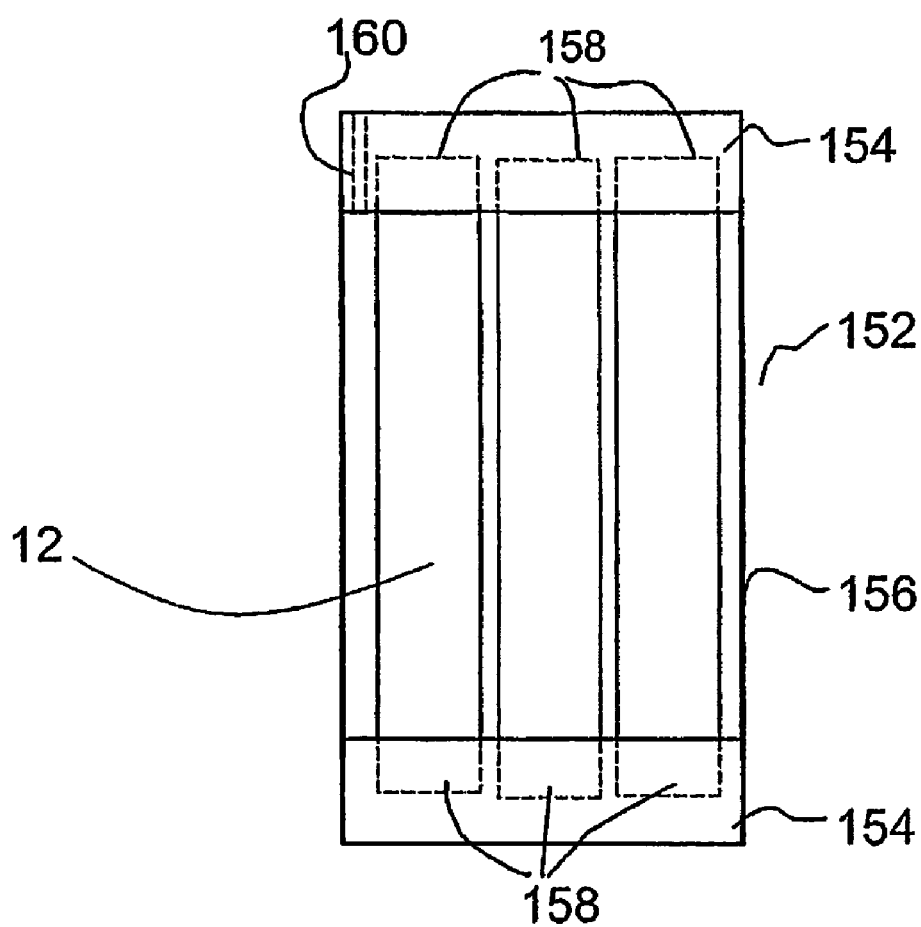

There are different processes to embed fuel cells in the porous matrix. According to one process, and referring to FIGS. 31 and 32, an apparatus 152 is provided for immersing a plurality of fuel cells 12 in a slurry of matrix material. The apparatus 152 comprises a pair of end plates 154 made of a ceramic, superalloy or another material capable of withstanding sintering, a combustible flexible sheet 156, and means for supplying the slurry to the container (not shown). The end plates 154 each have a plurality of indentations 158 on one of their major faces; the indentations 158 are shaped and sized to accept the ends of fuel cells 12. The flexible sheet 156 may be made of paper board or a suitable plastic material. Upon sintering (described below), the flexible sheet 156 burns away. Alternatively, the flexible sheet 156 may be replaced by a non-combustible container wall (not shown) of ceramic such as alumina or zirconia, or metal. Such container serves to contain the slurry during heat treatment/sintering, but can also serve as an integral component of the fuel cell stack 10.

Each end of each fuel cell 12 is taped with a protective masking tape (not shown) or a suitable combustible coating to keep the ends free from the slurry. Then, each end plate 154 is clamped to each end of each fuel cell 12, holding each fuel cell 12 in place. Then, the flexible sheet 156 is wrapped around the fuel cells 12; the sheet 156 is large enough to wrap completely around the fuel cells 12 and to attach to each end plate 154. When wrapped, the sheet 156 and end plates 154 form a cylindrical container that encloses the fuel cells 12. A slurry injection port 160 is provided in one of the base plates.

The slurry is a suspension of the matrix material, water or organic solvent, a dispersant, a foaming agent, organic monomers and an initiator. The matrix material in this case is LSM (lanthanum strontium manganate), but can be any ceramic and/or metal powder having suitable properties, such as doped $LaCrO_3$ (e.g. $La_{1-x}Sr_xCrO_3$, $La_{1-x}Ca_xCrO_3$, $La_{1-x}Mg_xCrO_3$, $LaCr(Mg)O_3$, $LaCa_{1-x}Cr_yO_3$), stainless steel (e.g. 316, 316L), cermets such as: Ni-Yittria stabilized zirconia, Ni and doped zirconia cermet, Ni doped—$CeO_2$ cermet, Cu doped-ceria cermet, silver-(Bi—Sr—Ca—Cu—O)-oxide cermet, silver-(Y—Ba—Cu—O)-oxide cermet; silver-alloy-(Bi—Sr—Ca—Cu—O)-oxide cermet; silver-alloy-(Y—Ba—Cu—O)-oxide cermet; silver and its alloys, Inconel steel or any super alloy, ferritic steel, SiC, and $MoSi_2$. The organic monomers may be mehty methacrylate, butyl arcylate, acrylamide, or other acrylates. The dispersant may be polyacrylic acid. The foaming agents may be Tergiton TMN10 or Triton X114. The initiator may be ammonium persulphate (APS) The slurry upon heat treatment will produce a foam that has a porous structure wherein the majority of the pores are interconnected to provide continuous fluid pathways. Upon sintering, this foam becomes the solid-state porous matrix 20.

Instead of or in addition to the foaming agent, combustible additives may be added to the slurry, such as polymer powder, organic powder, saw dust and fibres. Upon sintering at a temperature hot enough to combust the combustible additives, the additives burn away, leaving behind the solid-state matrix 20 with a foam-like porous microstructure.

Instead of or in addition to the foaming agent and combustible additives, a porous foam-like microstructure can be formed by using hollow ceramic particles. Spherical ceramic particles such as commercially available alumina bubbles ($Al_2O_3$) are first coated with matrix material, e.g. by dipping or spraying the particles with the slurry, or by electroless coating of matrix material onto the particles. Then, the coated particles are placed in a container having a plurality of tubular fuel cells arranged in the desired stack configuration. The container is packed with the particles such that tubular fuel cells are held securely in place. Then, a lid is placed on the container, and the filled container is subjected to a sintering process whereby the coating will bond with the particles thereby physically interconnecting the particles.

The slurry is injected or poured through the slurry port 60 until the container is filled and the fuel cells 12 are immersed with slurry. The slurry is left to completely dry at ambient temperature (or at an elevated temperature up to about 120° C.).

After the slurry has dried, the container and its contents are sintered. The sintering cycle involves first increasing the temperature from ambient to 200° C. for and holding at that temperature 1–10 hours, then increasing the temperature to 500° C. and holding at that temperature for 1–10 hours, then increasing the temperature to 650° C. and holding at that temperature for 1–10 hours, then increasing the temperature to 900° C. and holding at that temperature for 1–10 hours, then finally increasing the temperature to 1000–1400° C. and holding at that temperature for 5 hours. The rate of temperature increase in each step is between 20–300° C. The temperature is then allowed to drop to ambient temperature at a rate of between 60–300° C.

During sintering, the combustible flexible sheet 56 is burned away, leaving behind a fuel cell stack 10 or sub-stack 40 having the fuel cells 12 embedded in the solidified porous matrix 20 such that the matrix surrounds the length of each embedded fuel cell (because the ends of the fuel cells are masked prior to coating with slurry, they are free of the matrix). The end plates 54 are then removed, and the stack 10 is ready for combining with other components to produce a fuel cell system, or the sub-stack 40 is ready for combining with other sub-stacks to form the stack 10.

According to an alternative embodiment of the invention (not shown), the stack or sub-stack can be formed by first coating each fuel cell with slurry, then stacking the slurry-coated fuel cells onto a plate such that the slurry coat on each fuel cell contacts the slurry coat in adjacent fuel cells. The coating may be effected by dip-coating or spraying or other suitable known means. Combustible spacers may be placed between the fuel cells during stacking, to maintain a desired separation between fuel cells in the stack. The spacers may have different geometries depending on the desired geometrical configuration of the stack, e.g. hexagonal inserts will form a stack of fuel cells in a honeycomb-like configuration. Then, the stacked cells are allowed to dry, and sintered according to the sintering steps described above, such that a sub-stack having the fuel cells embedded in the porous matrix is formed. Upon sintering, the combustible spacers, if any, burn away. Alternatively, the spacers may be made from a non-combustible material such as metal; such spacers remain with the fuel cells after sintering, and in such case, are provided with channels therethrough to allow reactant to flow through the spacers.

According to another alternative embodiment of the invention (not shown), the stack or sub-stack can be formed by first coating each fuel cell with slurry, then stacking the slurry-coated fuel cells onto a flexible sheet of paper, plastic or other suitably flexible material such that the slurry coat on each fuel cell contacts the slurry coat in adjacent fuel cells. Again, combustible spacers may be inserted between fuel cells. The flexible sheet can then be folded, bent, or otherwise manipulated into a desired shape of the sub-stack, e.g. the sheet can bent into a cylindrical or another desired shape to form a stack or sub-stack. The fuel cells, slurry, and sheet are then dried and sintered according to the steps described above. The sheet may be made of a combustible material that burns away upon sintering.

According to yet another alternative embodiment of the invention (not shown), the stack or sub-stack can be formed by first pouring the slurry into a container, then inserting one or more combustible rods or other suitable elongate member into the slurry. The slurry and rods are then dried and sintered according to the steps described above, and the rods burn away, leaving behind a porous matrix with channels corresponding to the burned-away rods. Then, a fuel cell corresponding in shape and size to the channel is inserted into each channel. If the fuel cell is not securely embedded in the channel, additional slurry may be poured between the fuel cell and the channel, and an additional drying and sintering step can be carried out to solidify the slurry and fasten the fuel cell in place.

Any of the above methods of producing the sub-stack can optionally include a further step of inserting combustible rods, filaments, fibres, tows or other suitable elongate members into the slurry before it dries, so that channels in the matrix are formed when the slurry is dried and sintered at a temperature sufficient to solidify the slurry into the matrix, and to burn away the combustible inserts. These channels can be parallel, perpendicular, or in any other direction relative to the fuel cells.

According to yet another alternative embodiment of the invention (not shown), the stack or sub-stack can be formed using a templated processing technique. This technique involves first inserting fuel cells into a suitable template material, such as a sponge, carbon felt, or graphite felt, such that the fuel cells are securely held in place. Then, the template material is impregnated with the slurry. Then, the slurry and fuel cell containing template is dried and sintered. During sintering, the template material will burn away, leaving behind a foam-like porous matrix.

If the fuel cells are too fragile to survive inserting directly into the template material, metal or plastic tubes (having an inside diameter at least as large as the outside diameter of the fuel cell) are first inserted into the template material, then the fuel cells are inserted into the tubes. The tubes are then withdrawn from the template material, leaving behind the embedded fuel cells. Alternatively, combustible tubes or rods may be inserted into the template material. The template is then impregnated with slurry and dried and sintered. Upon sintering, the combustible tubes/rods burn away, leaving behind channels that enable the fuel cells to be inserted into template material. If the fuel cells are not securely held inside these channels, additional slurry may be added, that upon drying and sintering will secure the fuel cells in place.

The template may be a non-combustible material such as an electrically conductive metal felt. The metal felt may be impregnated with a slurry that is ionically conductive and/or catalytic, to enhance the performance of the stack. In this case, a bonding slurry can be added between the felt and the fuel cells embedded in the felt. Upon heat treating, the bonding slurry will secure the fuel cells to the metal felt and improve the electrical conductivity between the felt and the fuel cell. The bonding slurry may be composed of cathode material, or the same metal as the felt. As an alternative to or in addition to adding bonding slurry, the fuel cell embedded felt may be placed inside a thermally and electrically insulating container and compressed by the container until a suitable contact is established between the felt and the fuel cells.

According to yet another embodiment of the invention, a fuel cell stack of small diameter tubular fuel cells are formed by wrapping each single cell in metal wire; two or more cells may be mechanically interconnected by wrapping the cells with a single wire. The wire serves as a support structure for the fuel cells, as well as a current collector. If the wire is coated with catalyst material, the wire can enhance the catalytic activity of the fuel cell stack.

According to another embodiment of the invention, a fuel cell stack of small diameter tubular fuel cells are formed by wrapping each single cell in a metal mesh; two or more cells may be mechanically interconnected by wrapping the cells with a single strip of metal mesh. The mesh serves as a support structure for the fuel cells, as well as a current collector. If the mesh is coated with catalyst material, the mesh can enhance the catalytic activity of the fuel cell stack.

Figures 36, 37, 38:
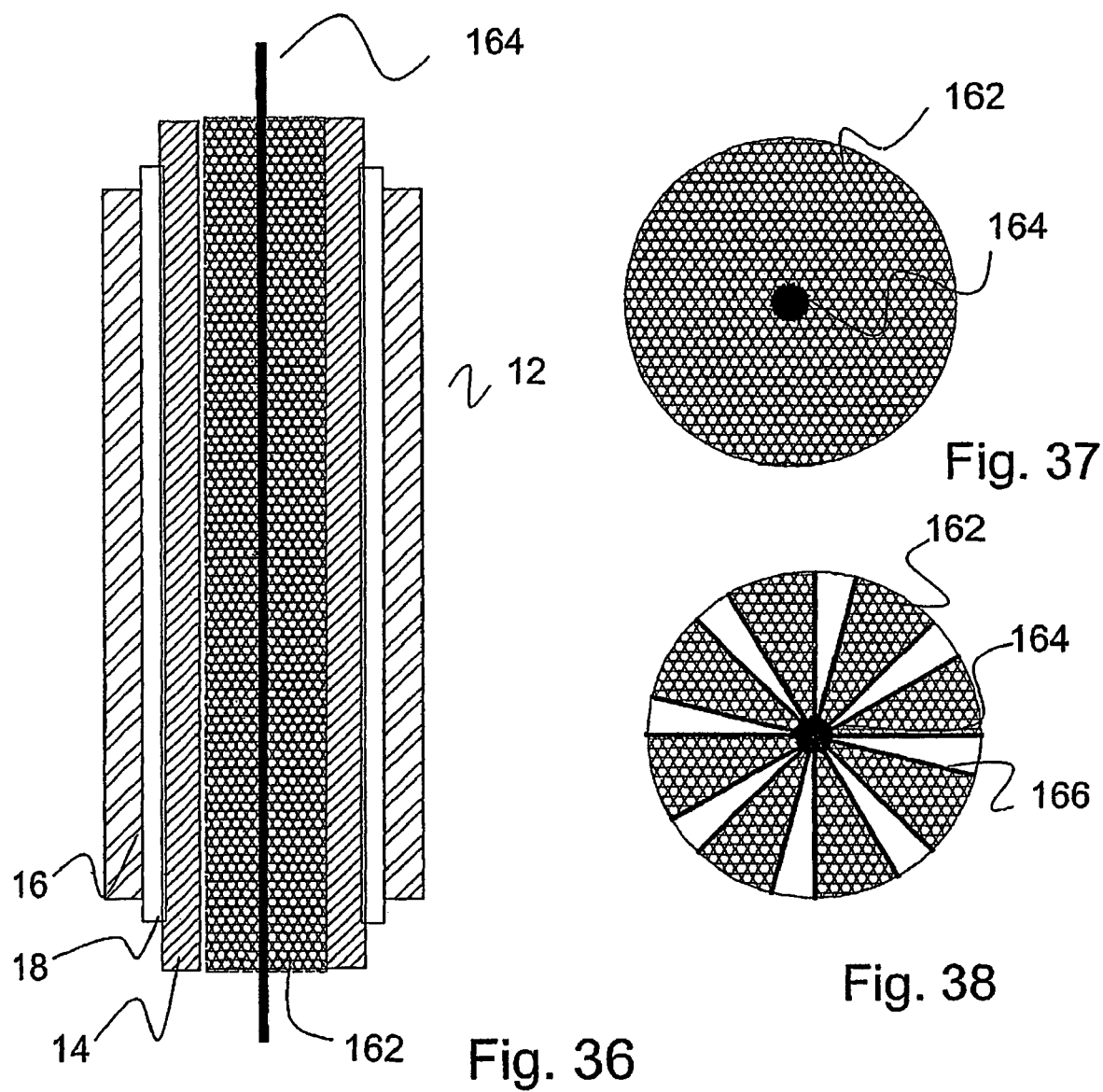
FIG. 36 is a schematic side view of the fuel cell in FIG. 33 having additionally an electrically conductive wire embedded in the inner core.
FIG. 37 is a schematic cross-sectional view of the inner core of FIG. 36.
FIG. 38 shows the inner core of FIG. 37 having interspersed reactant flow channels.

According to yet another embodiment of the invention, and referring to FIGS. 33–40, the inside of the fuel cell 12 may be lined with a porous current conductor 162. In particular, the current collector can be a porous electrically conductive inner foam core 162. The foam core 162 is electrically connected to the anode surface 14 of the fuel cell 12, and serves to collect current and provide mechanical support for the fuel cell 12. The porosity of the foam core 162 is selected to be sufficient to allow fuel to flow through the foam core 162 and reach the anode surface 14 of the fuel cell 12. The foam core 162 may be coated with a catalyst material to promote the electrochemical reaction. As seen in FIGS. 36 to 38, a metal wire 164 may be embedded in the centre of the core 162 such that one end extends out of the fuel cell 12 and is electrically couplable to the external circuit. Such a wire 164 serves to collect current. Alternatively, and referring to FIG. 41, multiple wires 164 are embedded in the foam core 162 at the electrode surface. A plurality of flow channels 166 may be formed in the core 162 to enhance the flowthrough of reactant.

Figure 39:
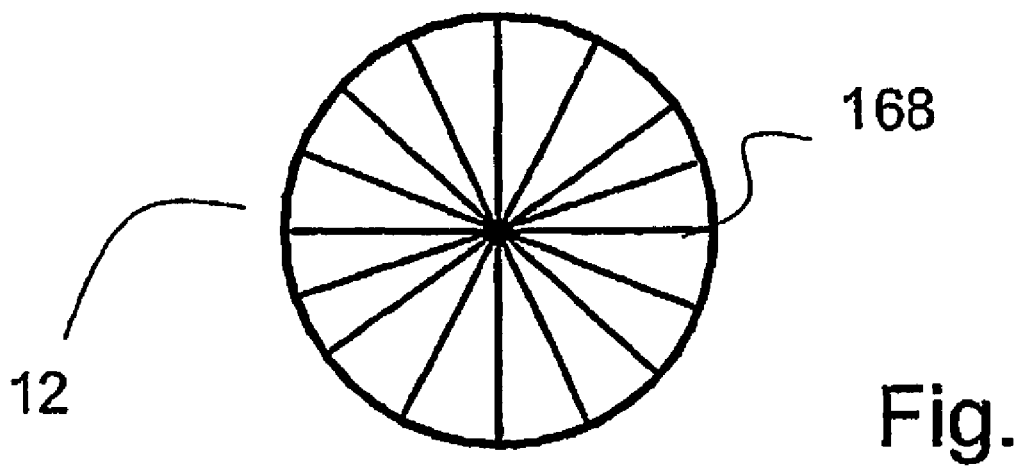
FIG. 39 is a schematic end view of an inner core having a series of longitudinally extending plates in physical and electrical contact with the electrode inner surface.

Referring to FIG. 39, instead of a inner foam core 162, the current collector may be a series of porous metal sheets 168 inserted inside each fuel cell 12 to provide mechanical support to the fuel cell 12 as well as to collect current. The metal sheets are attached at their longitudinal edges to the anode wall of the fuel cell 12.

Figure 40:
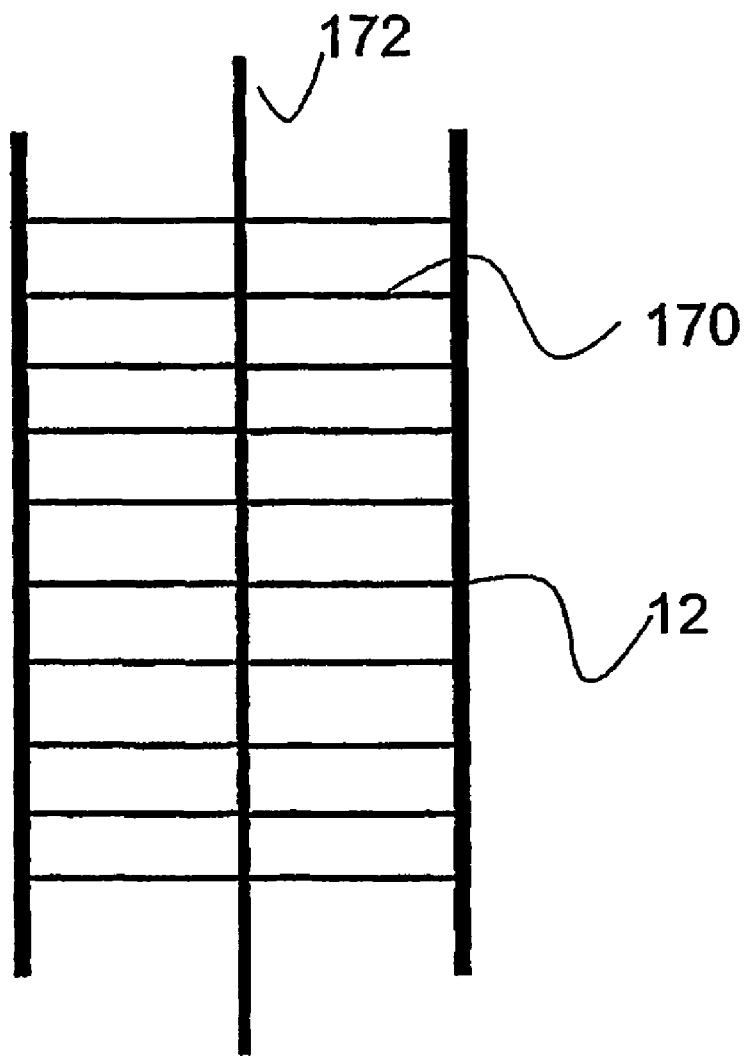
FIG. 40 is a schematic longitudinal view of an inner core having a central conductor rod and a plurality of filaments wrapped around the rod and physically and electrically contacting the electrode inner surface.
Figure 41:
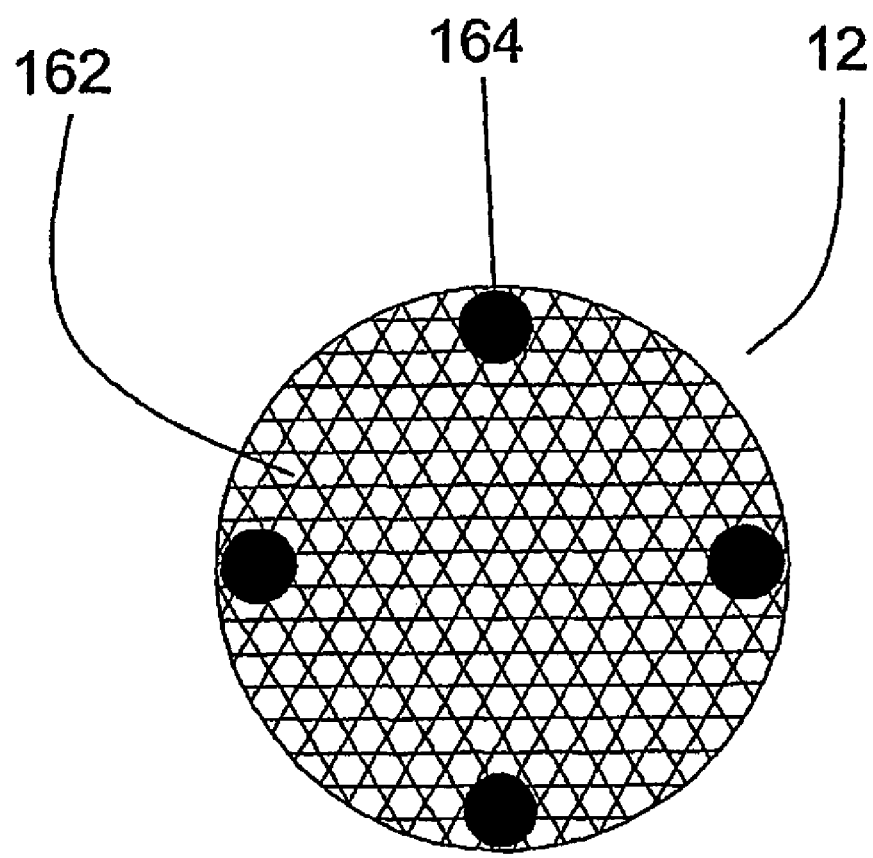
FIG. 41 is a schematic end view of the inner core of FIG. 34 in which a plurality of electrically conductive wires are embedded.

Referring to FIG. 40, instead of a inner foam core 162, the current collector is a plurality of metal filaments 170 wrapped around a longitudinally extending (parallel to the fuel cell 12) central metallic wire 172 such that the filaments extend transversely to the central wire to contact the anode inner wall. Such a core resembles a "wire brush".

While the preferred embodiment of the invention has been illustrated and described, it will be appreciated that various changes can be made therein without departing from the scope and spirit of the invention.

What is claim is:

1. A fuel cell system comprising:
   (a) an outer tubular solid oxide fuel cell comprising an inner electrode layer configured to receive a first reactant fluid, an outer electrode layer configured to receive a second reactant fluid, and an electrolyte layer sandwiched between the electrode layers;
   (b) a solid phase porous matrix located inside the outer fuel cell and attached to its inner electrode layer; and
   (c) at least one inner tubular solid oxide fuel cell embedded in the matrix substantially inside the outer fuel cell, the inner fuel cell having an outer electrode layer configured to receive the first reactant fluid, an inner electrode layer configured to receive the second reactant fluid, and an electrolyte layer sandwiched between the inner and outer electrode layers;
   the matrix having sufficient mechanical strength to support the inner fuel cell within the outer fuel cell and sufficient porosity to enable the first reactant fluid to flow through the matrix to the inner electrode layer of the outer fuel cell and to the outer electrode layer of the inner fuel cell.

2. The fuel cell system of claim 1 wherein the matrix is a solid state porous foam.

3. The fuel cell system of claim 2 wherein the foam is an electronic or mixed (electronic and ionic) conductive material and is electrically coupled to the cathode of the inner and outer fuel cells.

4. The fuel cell system of claim 3 wherein the foam composition includes one or more materials selected from the group consisting of: lanthanum strontium manganate, $La_{1-x}Sr_xCrO_3$, $La_{1-x}Ca_xCrO_3$, $La_{1-x}Mg_xCrO_3$, $LaCr(Mg)O_3$, $LaCa_{1-x}Cr_{-y}O_3$, $La_{1-x}Sr_xFeO_3$, $(La_{1-x}Sr_x)(Fe_1Co_y)O_3$, stainless steel 316 and 316L, Ni-Yittria stabilized zirconia, Ni and doped zirconia cermet, Ni doped $CeO_2$ cermet, Cu doped-ceria cermet, silver-(Bi—Sr—Ca—Cu—O)-oxide cermet, silver-(Y—Ba—Cu—O)-oxide cermet; silver-alloy-(Bi—Sr—Ca—Cu—O)-oxide cermet; silver-alloy-(Y—Ba—Cu—O)-oxide cermet; silver and its alloys, a super alloy, ferritic steel, SiC, and $MoSi_2$.

5. The fuel cell system of claim 4, wherein foam composition includes Inconel steel.

6. The fuel cell system of claim 2 wherein the inner fuel cell's inner electrode layer is an anode, the inner fuel cell's outer electrode layer is a cathode, the outer fuel cell's inner electrode layer is a cathode, the outer fuel cell's outer electrode is an anode, the first reactant is fuel, and the second reactant is oxidant.

7. The fuel cell system of claim 6 wherein the inner fuel cell has a diameter between 10 μm and 10,000 μm.

8. The fuel cell system of claim 7 wherein the inner fuel cell has a diameter between 10 μm and 5,000 μm.

9. The fuel cell system of claim 6 wherein the matrix includes at least one elongate void for enhancing the delivery of oxidant to the cathode of the inner and outer fuel cells.

10. The fuel cell system of claim 6 further comprising an oxidant diffuser that has an inlet fluidly connectable to an oxidant source, and a plurality of outlets fluidly coupled to the matrix.

11. The fuel cell system of claim 1 wherein the matrix is a material selected form the group consisting of a metal mesh, a metal, ceramic or cermet wool bundle, and metal, ceramic or cermet entangled fibrous bundle.

12. The fuel cell system of claim 1 further comprising:
a plurality of tab openings through the outer electrode and electrolyte layers of the inner fuel cell, the tab openings being spaced along the length of the inner fuel cell; and
a gas-impermeable, electrically conductive tab located in and sealing each opening, each tab being electrically connected to the inner electrode layer of the inner fuel cell and electrically connectable to an external circuit.

13. The fuel cell stack of claim 12 wherein each tab is an inert metal coating that is suitable for use under SOFC operating conditions.

14. The fuel cell system of claim 12 further comprising at least one current collector rod embedded in the matrix, and electrically connected to at least one of the tabs and electrically connectable to an external circuit.

15. The fuel cell system of claim 12 further comprising at least one current collector plate transversely embedded in the matrix inside the outer fuel cell, the plate being electrically insulated or isolated from the matrix by a high temperature insulating material between the plate and the matrix or by a gap between the plate and the matrix, the plate having an opening for receiving the inner fuel cell, and perforations that enable the flow through of a reactant fluid to the outer electrode layer of the inner fuel cell and the inner electrode layer of the outer fuel cell, the current collector plate being electrically connected to at least one of the tabs and electrically connectable to an external circuit.

16. The fuel cell system of claim 1 further comprising a fuel reformer comprising a reformer chamber with a fuel inlet for fluidly coupling to an unreformed fuel source and a fuel outlet fluidly coupled to the anode of the inner and outer fuel cells, the reformer chamber being thermally coupled with at least one of the fuel cells so that the heat produced by the fuel cell reaction is used to reform unreformed fuel.

17. The fuel cell system of claim 16 wherein the reformer chamber is a double-walled cup and the fuel cell is located inside the cavity of the cup.

18. The fuel cell system of claim 16 further comprising a catalyst-coated solid state porous matrix inside the reformer chamber.

19. The fuel cell system of claim 16 wherein the reformer chamber is a reformer tube coiled around the outer fuel cell, the fuel inlet and outlet being at opposite ends of the tube.

20. The fuel cell system of claim 19 wherein the reformer tube includes catalytic material dispersed along the inside of the reformer tube.

21. The fuel cell system of claim 1 wherein the inner fuel cell further comprises a porous electrically conductive current collector located inside the inner fuel cell, electrically coupled to its inner electrode layer, and having sufficient porosity to enable the flow of the second reactant fluid through the current collector and to the inner fuel cell's inner electrode layer.

22. The fuel cell system of claim 1 wherein the matrix substantially fills the inside of the outer fuel cell.

23. A fuel cell system comprising:
(a) at least one tubular solid oxide fuel cell, the fuel cell comprising an outer electrode layer configured to receive a first reactant fluid, an inner electrode layer configured to receive a second reactant fluid, and an electrolyte layer sandwiched between the electrode layers;
(b) a porous electrically conductive current collector located inside the fuel cell, electrically coupled to the inner electrode layer, and having sufficient porosity to enable the second reactant fluid to flow through the current collector and to the inner electrode layer, the current collector composition including one or more materials selected from the group consisting of: lanthanum strontium manganate, $La_{1-x}Sr_xCrO_3$, $La_{1-x}Ca_xCrO_3$, $La_{1-x}Mg_xCrO_3$, $LaCr(Mg)O_3$, $LaCa_{1-x}Cr_yO_3$, $La_{1-x}Sr_xFeO_3$, $(La_{1-x}Sr_x)(Fe_{1-y}Co_y)O_3$, stainless steel 316 and 316L, Ni-Yittria stabilized zirconia, Ni and doped zirconia cermet, Ni doped $CeO_2$ cermet, Cu doped-ceria cermet, silver-(Bi—Sr—Ca—Cu—O)-oxide cermet, silver-(Y—Ba—Cu—O)-oxide cermet; silver-alloy-(Bi—Sr—Ca—Cu—O)-oxide cermet; silver-alloy-(Y—Ba—Cu—O)-oxide cermet; silver and its alloys, a super alloy, ferritic steel, SiC, and $MoSi_2$; and
(c) a solid phase porous support matrix in which the fuel cell is embedded, the matrix having sufficient mechanical strength to support the fuel cell inside the system and sufficient porosity to enable the first reactant fluid to flow through the matrix and to the outer electrode layer.

24. The fuel cell system of claim 23 wherein the current collector is a bundle of overlapping metal, electrically conductive ceramic or cermet fibres.

25. The fuel cell system of claim 23 wherein the current collector is a bundle of metal, electrically conductive ceramic or cermet wool.

26. The fuel cell system of claim 23 wherein the current collector has a porosity of between 25 and 95%.

27. The fuel cell system of claim 26 wherein the current collector has a porosity of between 40 and 95%.

28. The fuel cell system of claim 27 wherein the current collector has a porosity of about 60%.

29. The fuel cell system of claim 23 wherein the support matrix composition includes a material selected from the group consisting of: lanthanum strontium manganate, $La_{1-x}Sr_xCrO_3$, $La_{1-x}Ca_xCrO_3$, $La_{1-x}Mg_xCrO_3$, $LaCr(Mg)O_3$, $LaCa_{1-x}Cr_yO_3$, $La_{1-x}Sr_xFeO_3$, $(La_{1-x}Sr_x)(Fe_{1-y}Co_y)O_3$, stainless steel 316 and 316L, Ni-Yittria stabilized zirconia, Ni and doped zirconia cermet, Ni doped $CeO_2$ cermet, Cu doped-ceria cermet, silver-(Bi—Sr—Ca—Cu—O)-oxide cermet, silver-(Y—Ba—Cu—O)-oxide cermet; silver-alloy-(Bi—Sr—Ca—Cu—O)-oxide cermet; silver-alloy-(Y—Ba—Cu—O)-oxide cermet; silver and its alloys, a super alloy, ferritic steel, SiC, and $MoSi_2$.

30. The fuel cell system of claim 29, wherein the support matrix composition includes Inconel steel.

31. The fuel cell system of claim 23 wherein the current collector substantially fills the inside of the fuel cell.

32. The fuel cell system of claim 23, wherein the current collector composition includes Inconel steel.

* * * * *